United States Patent
Zheng et al.

(10) Patent No.: US 12,532,204 B2
(45) Date of Patent: Jan. 20, 2026

(54) MEASUREMENT METHOD, MEASUREMENT APPARATUS, TERMINAL, AND NETWORK DEVICE

(71) Applicant: VIVO MOBILE COMMUNICATION CO., LTD., Dongguan (CN)

(72) Inventors: Qian Zheng, Dongguan (CN); Xiaodong Yang, Dongguan (CN)

(73) Assignee: VIVO MOBILE COMMUNICATION CO., LTD., Dongguan (CN)

(*) Notice: Subject to any disclaimer, the term of this patent is extended or adjusted under 35 U.S.C. 154(b) by 362 days.

(21) Appl. No.: 18/123,324

(22) Filed: Mar. 19, 2023

(65) Prior Publication Data
US 2023/0232268 A1    Jul. 20, 2023

Related U.S. Application Data

(63) Continuation of application No. PCT/CN2021/118511, filed on Sep. 15, 2021.

(30) Foreign Application Priority Data

Sep. 21, 2020   (CN) .......................... 202010997402.9

(51) Int. Cl.
*H04W 24/10*    (2009.01)
*H04B 17/318*   (2015.01)
(Continued)

(52) U.S. Cl.
CPC .......... *H04W 24/10* (2013.01); *H04B 17/318* (2015.01); *H04W 72/25* (2023.01); *H04W 84/12* (2013.01)

(58) Field of Classification Search
CPC .... H04B 17/318; H04W 24/10; H04W 72/25; H04W 74/12
See application file for complete search history.

(56) References Cited

U.S. PATENT DOCUMENTS

2018/0338268 A1* 11/2018 Lee .................... H04L 47/2475
2020/0260463 A1*  8/2020 Lovlekar ............... H04W 76/15
(Continued)

FOREIGN PATENT DOCUMENTS

CN    106376033 A    2/2017
CN    109246659 A    1/2019
(Continued)

OTHER PUBLICATIONS

Extended European Search Report issued in related European Application No. 21868650.9, mailed Feb. 15, 2024, 10 pages.
(Continued)

*Primary Examiner* — Brian P Cox
(74) *Attorney, Agent, or Firm* — IPX PLLC

(57) ABSTRACT

A measurement method, a measurement apparatus, a terminal, and a network device are provided. The measurement method includes: obtaining measurement configuration information and measurement report configuration information for a communication, where the communication includes at least one of a first communication or a second communication, and the first communication or the second communication is a SideLink (SL) communication; starting measurement according to the measurement configuration information, to obtain a measurement result; and sending the measurement result according to the measurement report configuration information.

15 Claims, 10 Drawing Sheets

(51) Int. Cl.
H04W 72/25 (2023.01)
H04W 84/12 (2009.01)

(56) References Cited

U.S. PATENT DOCUMENTS

2021/0298039 A1* 9/2021 Yuan ................. H04W 72/0453
2022/0286977 A1* 9/2022 Yang .................... H04W 52/24

FOREIGN PATENT DOCUMENTS

| CN | 111294773 A | 6/2020 | |
|---|---|---|---|
| WO | 2019162904 A1 | 8/2019 | |
| WO | WO-2020119446 A1 * | 6/2020 | ........... H04L 5/0048 |

OTHER PUBLICATIONS

First Office Action issued in related Chinese Application No. 202010997402.9, mailed Dec. 7, 2023, 7 pages.
International Search Report issued in corresponding International Application No. PCT/CN2021/118511, mailed Nov. 29, 2021, 4 pages.

* cited by examiner

MEASUREMENT METHOD, MEASUREMENT APPARATUS, TERMINAL, AND NETWORK DEVICE

CROSS-REFERENCE TO RELATED APPLICATIONS

This application is a continuation of International Application No. PCT/CN2021/118511, filed on Sep. 15, 2021, which claims priority to Chinese Patent Application No. 202010997402.9, filed on Sep. 21, 2020. The entire contents of each of the above-identified applications are expressly incorporated herein by reference.

TECHNICAL FIELD

This application relates to the field of communication technologies, and specifically, to a measurement method, a measurement apparatus, a terminal, and a network device.

BACKGROUND

A SideLink (SL), also referred to as a side link or sidelink, may be configured to perform direct data transmission between terminals without going through a network device. However, currently, different terminals may support a plurality of communication capabilities, and communication capabilities of the terminals are different in different situations. If a poor communication capability is used, service transmission between terminals may be affected, resulting in poor service transmission performance between the terminals.

SUMMARY

An objective of embodiments of this application is to provide measurement method, a measurement apparatus, a terminal, and a network device.

According to a first aspect, a measurement method is provided, is applied to a first terminal, and includes:
  obtaining measurement configuration information and measurement report configuration information for a communication, where the communication includes at least one of a first communication or a second communication, and the first communication or the second communication is a SideLink (SL) communication;
  starting measurement according to the measurement configuration information, to obtain a measurement result; and
  sending the measurement result according to the measurement report configuration information.

According to a second aspect, a measurement method is provided, is applied to a second terminal, and includes:
  sending measurement configuration information and measurement report configuration information for a communication to a first terminal, where the communication includes at least one of a first communication or a second communication, and the first communication or the second communication is a SL communication.

According to a third aspect, a measurement method is provided, is applied to a first network device, and includes:
  sending measurement configuration information and measurement report configuration information for a communication to a first terminal, where the communication includes at least one of a first communication or a second communication, and the first communication or the second communication is a SL communication; and
  receiving a measurement result sent by the first terminal.

According to a fourth aspect, a measurement apparatus is provided, is applied to a first terminal, and includes:
  a first obtaining module, configured to obtain measurement configuration information and measurement report configuration information for a communication, where the communication includes at least one of a first communication or a second communication, and the first communication or the second communication is a SL communication;
  a second obtaining module, configured to start measurement according to the measurement configuration information, to obtain a measurement result; and
  a sending module, configured to send the measurement result according to the measurement report configuration information.

According to a fifth aspect, a measurement apparatus is provided, is applied to a second terminal, and includes:
  a sending module, configured to send measurement configuration information and measurement report configuration information for a communication to a first terminal, where the communication includes at least one of a first communication or a second communication, and the first communication or the second communication is a SL communication.

According to a sixth aspect, a measurement apparatus is provided, is applied to a first network device, and includes:
  a sending module, configured to send measurement configuration information and measurement report configuration information for a communication to a first terminal, where the communication includes at least one of a first communication or a second communication, and the first communication or the second communication is a SL communication; and
  a receiving module, configured to receive a measurement result sent by the first terminal.

According to a seventh aspect, a terminal is provided, including a processor, a memory, and a program or instruction stored on the memory and executable on the processor, the program or instruction, when executed by the processor, implementing steps of the measurement method according to the first aspect; or the program or instruction, when executed by the processor, implementing steps of the measurement method according to the second aspect.

According to an eighth aspect, a network device is provided, including a processor, a memory, and a program or instruction stored on the memory and executable on the processor, the program or instruction, when executed by the processor, implementing steps of the measurement method according to the third aspect.

According to a ninth aspect, a readable storage medium is provided, storing a program or instruction, the program or instruction, when executed by a processor, implementing steps of the measurement method according to the first aspect, or implementing steps of the measurement method according to the second aspect, or implementing steps of the measurement method according to the third aspect.

According to a tenth aspect, a chip is provided, including a processor and a communication interface, where the communication interface is coupled to the processor, and the processor is configured to run a program or instruction of a network-side device, to implement steps of the measurement method according to the first aspect, or implement steps of the measurement method according to the second aspect, or implement steps of the measurement method according to the third aspect.

DETAILED DESCRIPTION

The following describes the embodiments of this application with reference to the accompanying drawings in the embodiments of this application. Apparently, the described embodiments are some embodiments of this application rather than all of the embodiments. All other embodiments obtained by a person of ordinary skill in the art based on the embodiments of this application without creative efforts shall fall within the protection scope of this application.

The specification and claims of this application, and terms "first" and "second" are used to distinguish similar objects, but are unnecessarily used to describe a specific sequence or order. It should be understood that the data in such a way are interchangeable in proper circumstances, so that the embodiments of this application can be implemented in other orders than the order illustrated or described herein. Objects distinguished by "first" and "second" are usually one type, and the quantity of objects is not limited. For example, the first object may be one or more than one. In addition, in the specification and the claims, "and/or" means at least one of the connected objects, and the character "I" generally indicates an "or" relationship between the associated objects.

It should be noted that, the technologies described in the embodiments of this application are not limited to a Long Term Evolution (LTE) system or an LTE-Advanced (LTE-A) system, and can also be used in other wireless communication systems, such as, Code Division Multiple Access (CDMA), Time Division Multiple Access (TDMA), Frequency Division Multiple Access (FDMA), Orthogonal Frequency Division Multiple Access (OFDMA), and Single-Carrier Frequency-Division Multiple Access (SC-FDMA). The terms "system" and "network" in the embodiments of this application are often used interchangeably, and the described technology can be used not only for the above systems and radio technologies, but also for other systems and radio technologies. However, the following description describes a New Radio (NR) system for example objectives, and NR terms are used in most of the description below, although these technologies are also applicable to applications other than NR system applications, such as a $6^{th}$ Generation (6G) communication system.

Figure 1:
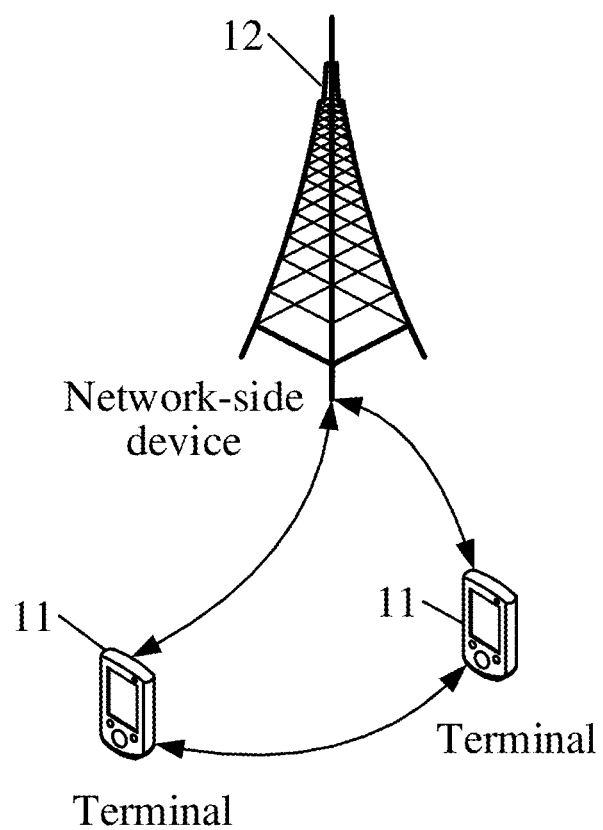
FIG. 1 is a structural diagram of a network system according to an embodiment of this application.

FIG. 1 is a block diagram of a wireless communication system to which the embodiments of this application are applicable. The wireless communication system includes a terminal 11 and a network-side device 12. The terminal 11 may also be referred to as a terminal device or User Equipment (UE). The terminal 11 may be, for example, a terminal-side device such as a mobile phone, a tablet personal computer, a laptop computer, a Personal Digital Assistant (PDA), a palmtop computer, a netbook, an Ultra-Mobile Personal Computer (UMPC), a Mobile Internet Device (MID), a wearable device, a Vehicle User Equipment (VUE), or a Pedestrian User Equipment (PUE). The wearable device includes: a bracelet, earphones, glasses, or the like. It should be noted that, a specific type of the terminal 11 is not limited in the embodiments of this application. The network-side device 12 may be a base station or a core network, where the base station may be referred to as a Node B, an evolved node B, an access point, a Base Transceiver Station (BTS), a radio base station, a radio transceiver, a Basic Service Set (BSS), an Extended Service Set (ESS), a node B, an evolved node B (eNB), a home node B, a home evolved node B, a WLAN access point, a WiFi node, a Transmitting Reception Point (TRP), or another appropriate term in the field, as long as the same technical effect is achieved. The base station is not limited to a specific technical term. It should be noted that, a base station in the NR system is used as an example in the embodiments of this application, but a specific type of the base station is not limited.

A measurement method provided in the embodiments of this application is described below through specific embodiments and application scenarios thereof with reference to the accompanying drawings.

Figure 2:
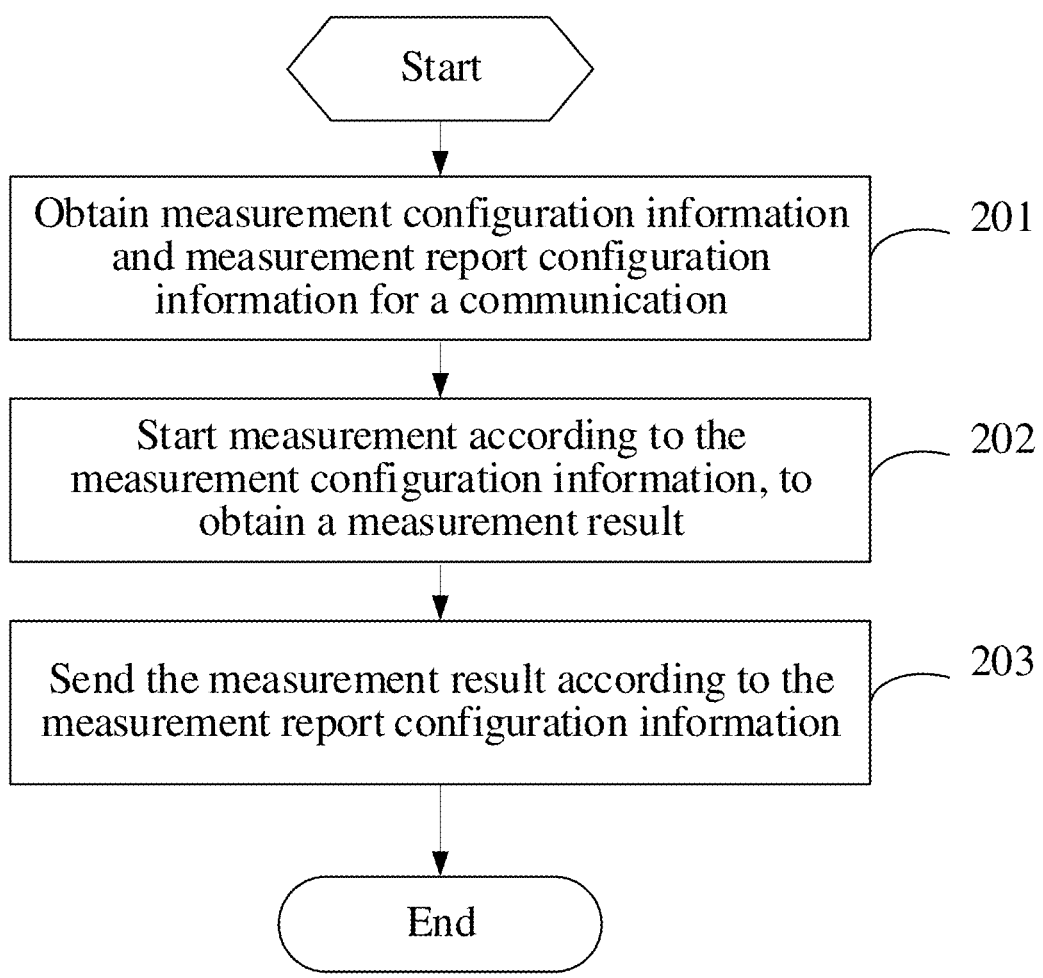
FIG. 2 is a first flowchart of a measurement method according to an embodiment of this application.

FIG. 2 is a flowchart of a measurement method according to an embodiment of this application. The measurement method is applied to a first terminal, and includes the following steps:

Step 201. Obtain measurement configuration information and measurement report configuration information for a communication, where the communication includes at least one of a first communication or a second communication, and the first communication or the second communication is a SideLink (SL) communication.

Step 202. Start measurement according to the measurement configuration information, to obtain a measurement result.

Step 203. Send the measurement result according to the measurement report configuration information.

In the above description, the measurement configuration information and the measurement report configuration information may be pre-configured on the first terminal, or may be obtained from another device, for example, may be sent by a first network device to the first terminal, or may be sent by a second terminal to the first terminal. That is, the measurement configuration information and the measurement report configuration information for the communication are determined according to the pre-configuration, or are configured by the first network device providing services for the first terminal, or are sent by the second terminal. Further, there is a SL Radio Resource Control (RRC) connection between the second terminal and the first terminal. The second terminal sends the measurement configuration information and the measurement report configuration information for the communication to the first terminal, and may also send the measurement configuration information and the measurement report configuration information for the communication through another connection between the first terminal and the second terminal. The another connection is not limited to the SL RRC connection (where the SL RRC connection may also be referred to as a PC5 RRC connection).

In this embodiment, measurement configuration information and measurement report configuration information for a communication are obtained, where the communication includes at least one of a first communication or a second communication, and the first communication or the second communication is a SL communication; measurement is started according to the measurement configuration information, to obtain a measurement result; and the measurement result is sent according to the measurement report configuration information. When service transmission is performed between a first terminal and a second terminal, the communication between the first terminal and the second terminal may be configured according to the measurement result, thereby improving the service transmission performance between the terminals.

In the above description, in a case that the measurement configuration information and the measurement report configuration information for the communication are sent by the second terminal, the measurement configuration information and the measurement report configuration information for the communication are determined according to a pre-configuration of the second terminal, or are configured by a second network device, where the second network device is a network device providing services for the second terminal. Further, there is an SL RRC connection between the second terminal and the first terminal.

In the above description, in a case that the measurement configuration information and the measurement report configuration information for the communication are sent by the second terminal, the sending the measurement result includes:
  sending the measurement result to the second terminal according to the measurement report configuration information;
  or
  sending the measurement result to a second network device according to the measurement report configuration information, where the second network device is a network device providing services for the second terminal.

In a case that the measurement configuration information and the measurement report configuration information for the communication are sent by the second terminal, the first terminal may send the measurement result to the second terminal according to the measurement report configuration information. Further, the second terminal sends the measurement result to the second network device. In some implementations, in a case that serving base stations of the first terminal and the second terminal are a same network device, that is, the first network device is the same as the second network device, that is, for example, in a case that the first terminal and the second terminal are covered by a same network, the first network device and the second network device may be the same one; otherwise, the first network device and the second network device are different, and then the first terminal does not send the measurement result through the second terminal, but directly sends the measurement result to the second network device. Whether the serving base stations of the first terminal and the second terminal are the same network device may be determined by interaction of serving cell information (PCI+a frequency) and an NR Cell Global Identity (NCGI) between the first terminal and the second terminal.

In a case that the measurement configuration information and the measurement report configuration information for the communication are sent by the first network device, the sending the measurement result includes:
  sending the measurement result to the first network device according to the measurement report configuration information.

In a case that the measurement configuration information and the measurement report configuration information for the communication are sent by the first network device, the first terminal may send the measurement result to the first network device according to the measurement report configuration information.

In the above description, the first communication is the SL communication, and the second communication is a WLAN communication or a Bluetooth communication.

In the above description, the measurement configuration information and the measurement report configuration information are carried in a system message and/or RRC reconfiguration signaling, or the measurement configuration information and the measurement report configuration information are carried in SL RRC reconfiguration signaling.

In a case that the measurement configuration information and the measurement report configuration information are sent by the first network device to the first terminal, the first network device may carry the measurement configuration information and the measurement report configuration information in the system message and/or the RRC reconfiguration signaling to send them to the first terminal.

In a case that the measurement configuration information and the measurement report configuration information are sent by the second terminal to the first terminal, the second terminal may carry the measurement configuration information and the measurement report configuration information in the RRC reconfiguration signaling to send them to the first terminal.

in a case that the measurement result includes a WLAN measurement result, the WLAN measurement result carries WLAN identification information. The WLAN identification information includes:
  a Basic Service Set IDentifier (BSSID), namely, a Wireless Fidelity (WiFi) Media Access Control address (MAC);
  a Homogenous Extended Service Set IDentifier (HESSID) defined in IEEE802 (HESSID defined in IEEE802);
  a Service Set IDentifier (SSID) defined in IEEE802 (SSID defined in IEEE802); and
  a WLAN version/protocol, for example, wifi 1-6, 802.11 a/b/g/n/ac/ax, or an Ether type 0x9E65.

The measurement report configuration information is used for indicating that the first terminal sends the measurement result in at least one of the following manners:
  periodically sending; or
  sending in a case that a measurement report event is met.

In a case that the first communication is the SL communication and the second communication is the WLAN communication, the measurement report configuration information may include at least one of the following:
  SL measurement periodic report information;
  WLAN measurement periodic report information;
  an SL measurement amount is lower than a first preset threshold;

the SL measurement amount is higher than a second preset threshold;

an WLAN measurement amount is lower than a third preset threshold;

the WLAN measurement amount is higher than a fourth preset threshold;

the SL measurement amount is lower than the first preset threshold, and the WLAN measurement amount is lower than the third preset threshold;

the SL measurement amount is lower than the first preset threshold, and the WLAN measurement amount is higher than the fourth preset threshold;

the SL measurement amount is higher than the second preset threshold, and the WLAN measurement amount is lower than the third preset threshold;

the SL measurement amount is higher than the second preset threshold, and the WLAN measurement amount is higher than the fourth preset threshold;

in a case that both the SL measurement amount and the WLAN measurement amount are Received Signal Strength Indications (RSSI) or Channel occupancy Ratios (CRs), the SL measurement amount is higher than a preset threshold of the WLAN measurement amount; or in a case that both the SL measurement amount and the WLAN measurement amount are the RSSIs or the channel occupancy ratios, the SL measurement amount is lower than the preset threshold of the WLAN measurement amount.

The first terminal may determine periodicity of sending the measurement result based on the SL measurement periodic report information and/or the WLAN measurement periodic report information. For example, the SL measurement periodic report information may include a reporting time interval, a duration of each reporting, a number of reporting each period, and the like; and the WLAN measurement periodic report information may also include a reporting time interval, a duration of each reporting, a number of reporting each period, and the like.

The measurement report event may be determined based on the measurement report configuration information. In a case that the first communication is the SL communication and the second communication is the WLAN communication, the measurement report event includes that:

an SL measurement amount is lower than a first preset threshold; and/or the SL measurement amount is higher than a second preset threshold; and/or an WLAN measurement amount is lower than a third preset threshold; and/or the WLAN measurement amount is higher than a fourth preset threshold; and/or one of the following:

in a case that both the SL measurement amount and the WLAN measurement amount are Received Signal Strength Indication (RSSI) or channel occupancy ratios, the SL measurement amount is higher than a preset threshold of the WLAN measurement amount; or in a case that both the SL measurement amount and the WLAN measurement amount are the RSSIs or the channel occupancy ratios, the SL measurement amount is lower than the preset threshold of the WLAN measurement amount.

The SL measurement amount includes: a Channel Busy Ratio (CBR), a Channel occupancy Ratio (CR), SL Reference Signal Receiving Power (RSRP), SL Reference Signal Receiving Quality (RSRQ), or an SL RSSI.

In the above description, in a case that the first communication is the SL communication and the second communication is the WLAN communication, the measurement report event may include the following: the SL measurement amount is lower than the first preset threshold, and the WLAN measurement amount is lower than the third preset threshold; or the SL measurement amount is lower than the first preset threshold, and the WLAN measurement amount is higher than the fourth preset threshold; or the SL measurement amount is higher than the second preset threshold, and the WLAN measurement amount is lower than the third preset threshold; or the SL measurement amount is higher than the second preset threshold, and the WLAN measurement amount is higher than the fourth preset threshold.

In the above description, SL measurement configuration information includes an SL measurement object and the SL measurement amount, where the SL measurement object includes at least one of an SL destination address or an SL frequency. Further, in a case that the SL measurement object includes the SL frequency, the SL measurement object further includes at least one of a resource pool or a reference signal.

In the above description, the WLAN measurement amount includes: a WLAN RSSI, a WLAN channel occupancy ratio, or a WLAN Round Trip Time (RTT).

WLAN measurement configuration information includes an WLAN measurement object and the WLAN measurement amount, where the WLAN measurement object includes at least one of a WLAN version, a WLAN frequency, a WLAN protocol, a WLAN bandwidth, or a WLAN reference signal.

In the above description, after the sending the measurement result to the second terminal according to the measurement report configuration information, the method further includes:

receiving an aggregation communication configuration of the first communication and the second communication that is determined according to the measurement result and is sent by the second terminal;

or receiving an aggregation communication configuration of the first communication and the second communication that is determined according to the measurement result and is sent by the second network device.

In a case that the second terminal receives the measurement result, the second terminal may determine the aggregation communication configuration of the first communication and the second communication according to the measurement result, and send the aggregation communication configuration of the first communication and the second communication to the first terminal. In a case that the second network device receives the measurement result, the second network device may determine the aggregation communication configuration of the first communication and the second communication according to the measurement result, and send the aggregation communication configuration of the first communication and the second communication to the first terminal. In this case, the second network device may also send the aggregation communication configuration of the first communication and the second communication to the second terminal.

An aggregation communication of the first communication and the second communication may also be referred to as an inter-working communication of the first communication and the second communication. For example, in a case that the first communication is the SL communication and the second communication is the WLAN communication, an aggregation communication of an SL and a WLAN may also be referred to as an inter-working communication of the SL and the WLAN.

The first communication may be the SL communication, and the second communication may be the WLAN communication. In a case that the second terminal receives the measurement result, the second terminal may determine, according to the measurement result, the aggregation communication configuration, split routing, duplication, and the like of the SL communication and the WLAN communication, and send the related configuration to the first terminal.

In a case that the second terminal receives the measurement result, the second terminal may further send the measurement result to a serving base station of the second terminal, namely, the second network device, so that the second network device determines the aggregation communication configuration, split routing, duplication, and the like of the SL communication and the WLAN communication, and sends the related configuration to the first terminal and the second terminal.

In the above description, after the sending the measurement result to the first network device according to the measurement report configuration information, the method further includes:

receiving an aggregation communication configuration of the first communication and the second communication that is determined according to the measurement result and is sent by the first network device.

In a case that the first network device receives the measurement result, the first network device may determine the aggregation communication configuration of the first communication and the second communication according to the measurement result, and send the aggregation communication configuration of the first communication and the second communication to the first terminal. Further, the first network device may also send the aggregation communication configuration of the first communication and the second communication to the second terminal.

For example, in a case that the first communication is the SL communication and the second communication is the WLAN communication, the first network device determines the aggregation communication configuration, split routing, duplication, and the like of the SL communication and the WLAN communication, and sends the related configuration to the first terminal and the second terminal.

In addition, the aggregation communication configuration of the first communication and the second communication may also be sent by the first terminal to the second terminal. That is, after the receiving an aggregation communication configuration of the first communication and the second communication that is determined according to the measurement result and is sent by the first network device, the method further includes:

sending the aggregation communication configuration of the first communication and the second communication that is determined according to the measurement result to the second terminal.

Figure 3:
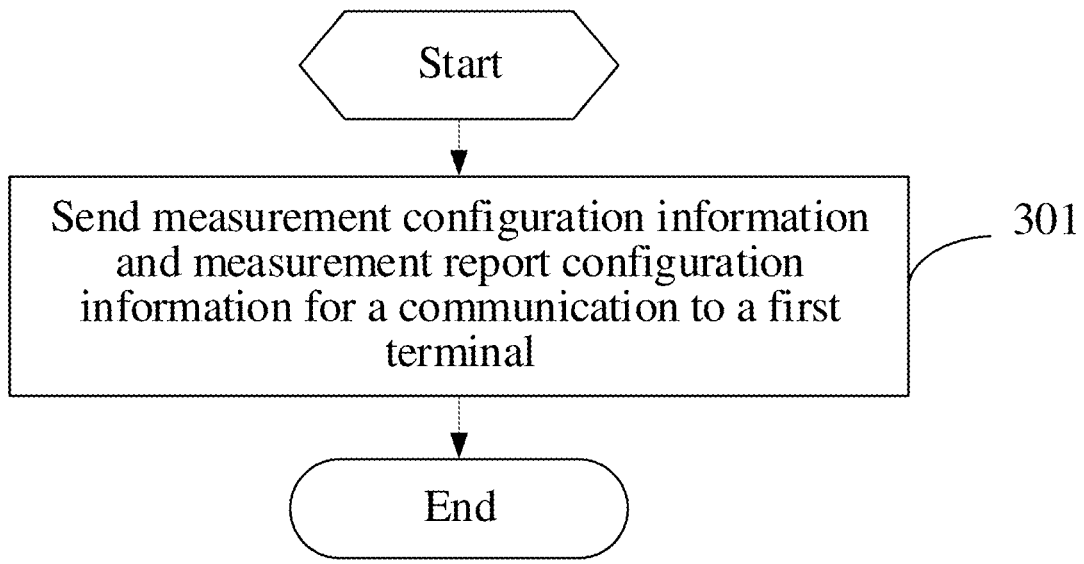
FIG. 3 is a second flowchart of a measurement method according to an embodiment of this application.

FIG. 3 is a flowchart of a measurement method according to an embodiment of this application. The measurement method is applied to a second terminal, and includes the following step:

Step 301. Send measurement configuration information and measurement report configuration information for a communication to a first terminal, where the communication includes at least one of a first communication or a second communication, and the first communication or the second communication is a sidelink SL communication.

The second terminal sends the measurement configuration information and the measurement report configuration information for the communication to the first terminal, so that the first terminal may start measurement according to the measurement configuration information, to obtain a measurement result; and send the measurement result according to the measurement report configuration information. When service transmission is performed between the first terminal and the second terminal, the communication between the first terminal and the second terminal may be configured according to the measurement result, thereby improving the service transmission performance between the terminals.

The measurement configuration information and the measurement report configuration information for the communication may be pre-configured on the second terminal, or may be configured by a second network device, where the second network device is a network device providing services for the second terminal.

There is a SL RRC connection between the second terminal and the first terminal. The second terminal sends the measurement configuration information and the measurement report configuration information for the communication to the first terminal, and may also send the measurement configuration information and the measurement report configuration information for the communication through another connection between the first terminal and the second terminal. The another connection is not limited to the SL RRC connection).

In this embodiment, a second terminal sends measurement configuration information and measurement report configuration information for a communication to a first terminal, where the communication includes at least one of a first communication or a second communication, and the first communication or the second communication is a SL communication, so that the first terminal may start measurement according to the measurement configuration information, to obtain a measurement result; and send the measurement result according to the measurement report configuration information. When service transmission is performed between the first terminal and the second terminal, the communication between the first terminal and the second terminal may be configured according to the measurement result, thereby improving the service transmission performance between the terminals.

In the above description, after the sending measurement configuration information and measurement report configuration information for a communication to a first terminal, the method further includes:

receiving a measurement result sent by the first terminal.

In a case that the measurement configuration information and the measurement report configuration information for the communication are sent by the second terminal, the first terminal may send the measurement result to the second terminal according to the measurement report configuration information. Further, the second terminal sends the measurement result to the second network device. That is, after the receiving a measurement result sent by the first terminal, the method further includes:

sending the measurement result to the second network device, where the second network device is a network device providing services for the second terminal.

In the above description, the first communication is the SL communication, and the second communication is a WLAN communication or a Bluetooth communication.

In the above description, the measurement configuration information and the measurement report configuration information are carried in SL RRC reconfiguration signaling.

In a case that the measurement configuration information and the measurement report configuration information are sent by the second terminal to the first terminal, the second terminal may carry the measurement configuration information and the measurement report configuration information in the RRC reconfiguration signaling to send them to the first terminal.

In a case that the measurement result includes a WLAN measurement result, the WLAN measurement result carries WLAN identification information. The WLAN identification information includes:
  a Basic Service Set IDentifier (BSSID), namely, a Wireless Fidelity (WiFi) Media Access Control address (MAC);
  a Homogenous Extended Service Set IDentifier (HESSID) defined in IEEE802 (HESSID defined in IEEE802);
  a Service Set IDentifier (SSID) defined in IEEE802 (SSID defined in IEEE802); and
  a WLAN version/protocol, for example, wifi 1-6, 802.11 a/b/g/n/ac/ax, or an Ether type 0x9E65.

The measurement report configuration information is used for indicating that the first terminal sends the measurement result in at least one of the following manners:
  periodically sending; or
  sending in a case that a measurement report event is met.

In a case that the first communication is the SL communication and the second communication is the WLAN communication, the measurement report event includes that:
  an SL measurement amount is lower than a first preset threshold; and/or
  the SL measurement amount is higher than a second preset threshold; and/or
  an WLAN measurement amount is lower than a third preset threshold; and/or
  the WLAN measurement amount is higher than a fourth preset threshold; and/or
  one of the following:
  in a case that both the SL measurement amount and the WLAN measurement amount are RSSI or CRs, the SL measurement amount is higher than a preset threshold of the WLAN measurement amount; or
  in a case that both the SL measurement amount and the WLAN measurement amount are the RSSIs or the CRs, the SL measurement amount is lower than the preset threshold of the WLAN measurement amount.

The SL measurement amount includes: a Channel Busy Ratio (CBR), the CR, SL Reference Signal Receiving Power (RSRP), SL Reference Signal Receiving Quality (RSRQ), or an SL RSSI.

In the above description, SL measurement configuration information includes an SL measurement object and the SL measurement amount, where the SL measurement object includes at least one of an SL destination address or an SL frequency. Further, in a case that the SL measurement object includes the SL frequency, the SL measurement object further includes at least one of a resource pool or a reference signal.

In the above description, the WLAN measurement amount includes: a WLAN RSSI, a WLAN channel occupancy ratio, or a WLAN Round Trip Time (RTT).

WLAN measurement configuration information includes an WLAN measurement object and the WLAN measurement amount, where the WLAN measurement object includes at least one of a WLAN version, a WLAN frequency, a WLAN protocol, a WLAN bandwidth, or a WLAN reference signal.

In the above description, after the receiving a measurement result sent by the first terminal, the method further includes:
  determining, in a case that the measurement result includes a measurement result of the first communication and a measurement result of the second communication, an aggregation communication configuration of the first communication and the second communication according to the measurement result; and
  sending the aggregation communication configuration of the first communication and the second communication to the first terminal.

The second terminal determines the communication configuration according to the received measurement result. In some implementations, in a case that the measurement result includes the measurement result of the first communication and the measurement result of the second communication, the aggregation communication configuration of the first communication and the second communication is determined according to the measurement result, and the aggregation communication configuration of the first communication and the second communication is sent to the first terminal.

In the above description, after the sending the measurement result to the second network device, the method further includes:
  receiving an aggregation communication configuration of the first communication and the second communication that is determined according to the measurement result and is sent by the second network device.

In a case that the second terminal sends the measurement result to the second network device, the second network device determines the communication configuration according to the received measurement result. In some implementations, in a case that the measurement result includes the measurement result of the first communication and the measurement result of the second communication, the second network device determines the aggregation communication configuration of the first communication and the second communication according to the measurement result, and sends the aggregation communication configuration of the first communication and the second communication to the first terminal and the second terminal.

Figure 4:
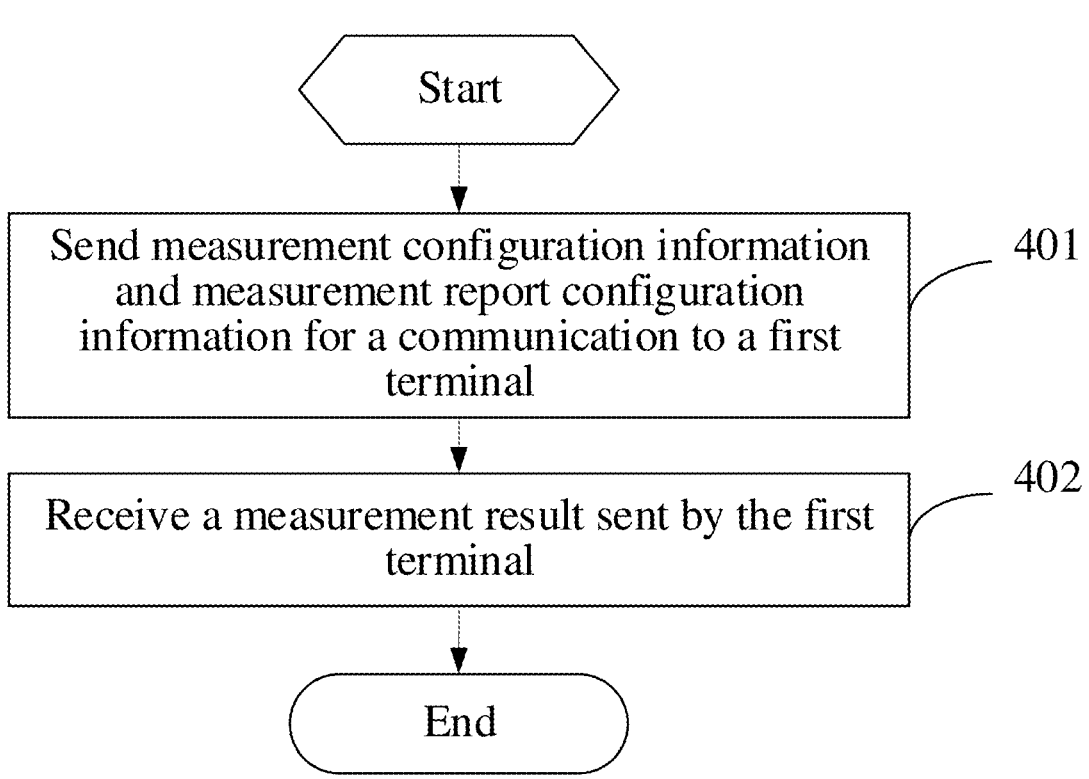
FIG. 4 is a third flowchart of a measurement method according to an embodiment of this application.

FIG. 4 is a flowchart of a measurement method according to an embodiment of this application. The measurement method is applied to a first network device, and includes the following steps:
  Step 401. Send measurement configuration information and measurement report configuration information for a communication to a first terminal, where the communication includes at least one of a first communication or a second communication, and the first communication or the second communication is a sidelink SL communication.
  Step 402. Receive a measurement result sent by the first terminal.

The first communication is the SL communication, and the second communication is a WLAN communication or a Bluetooth communication. The measurement configuration information and the measurement report configuration information are carried in a system message and/or RRC reconfiguration signaling. That is, the first network device may carry the measurement configuration information and the measurement report configuration information in the system message and/or the RRC reconfiguration signaling to send them to the first terminal.

In this embodiment, measurement configuration information and measurement report configuration information for a communication are sent to a first terminal, where the communication includes at least one of a first communication or a second communication, and the first communication or the second communication is a SL communication; and a measurement result sent by the first terminal is received, so that a first network device configures the communication between the first terminal and the second terminal according to the measurement result, thereby improving the service transmission performance between the terminals.

In the above description, in a case that the measurement result includes a WLAN measurement result, the WLAN measurement result carries WLAN identification information. The WLAN identification information includes:
- a Basic Service Set IDentifier (BSSID), namely, a WiFi MAC;
- a Homogenous Extended Service Set IDentifier (HESSID) defined in IEEE802 (HESSID defined in IEEE802);
- a Service Set IDentifier (SSID) defined in IEEE802 (SSID defined in IEEE802); and
- a WLAN version/protocol, for example, wifi 1-6, 802.11 a/b/g/n/ac/ax, or an Ether type 0x9E65.

The measurement report configuration information is used for indicating that the first terminal sends the measurement result in at least one of the following manners:
- periodically sending; or
- sending in a case that a measurement report event is met.

In a case that the first communication is the SL communication and the second communication is the WLAN communication, the measurement report event includes that:
- an SL measurement amount is lower than a first preset threshold; and/or
- the SL measurement amount is higher than a second preset threshold; and/or
- an WLAN measurement amount is lower than a third preset threshold; and/or
- the WLAN measurement amount is higher than a fourth preset threshold; and/or
- one of the following:
- in a case that both the SL measurement amount and the WLAN measurement amount are Received Signal Strength Indication (RSSI) or channel occupancy ratios, the SL measurement amount is higher than a preset threshold of the WLAN measurement amount; or
- in a case that both the SL measurement amount and the WLAN measurement amount are the RSSIs or the channel occupancy ratios, the SL measurement amount is lower than the preset threshold of the WLAN measurement amount.

The SL measurement amount includes: a Channel Busy Ratio (CBR), a Channel occupancy Ratio (CR), SL Reference Signal Receiving Power (RSRP), SL Reference Signal Receiving Quality (RSRQ), or an SL RSSI.

In the above description, SL measurement configuration information includes an SL measurement object and the SL measurement amount, where the SL measurement object includes at least one of an SL destination address or an SL frequency. Further, in a case that the SL measurement object includes the SL frequency, the SL measurement object further includes at least one of a resource pool or a reference signal.

In the above description, the WLAN measurement amount includes: a WLAN RSSI, a WLAN channel occupancy ratio, or a WLAN Round Trip Time (RTT).

WLAN measurement configuration information includes an WLAN measurement object and the WLAN measurement amount, where the WLAN measurement object includes at least one of a WLAN version, a WLAN frequency, a WLAN protocol, a WLAN bandwidth, or a WLAN reference signal.

After the receiving a measurement result sent by the first terminal, the method further includes:
- determining, in a case that the measurement result includes a measurement result of the first communication and a measurement result of the second communication, an aggregation communication configuration of the first communication and the second communication according to the measurement result; and
- sending the aggregation communication configuration of the first communication and the second communication to the first terminal, or sending the aggregation communication configuration of the first communication and the second communication to the first terminal and a second terminal.

In some implementations, the first network device may determine the aggregation communication configuration of the first communication and the second communication according to the measurement result, and send the aggregation communication configuration of the first communication and the second communication to the first terminal. Further, the first terminal sends the aggregation communication configuration of the first communication and the second communication to the second terminal. When there is an SL RRC connection between the second terminal and the first terminal, the first terminal sends the aggregation communication configuration of the first communication and the second communication to the second terminal through the SL RRC connection.

Further, the first network device may also send the aggregation communication configuration of the first communication and the second communication to the first terminal and the second terminal.

For example, in a case that the first communication may be the SL communication and the second communication may be the WLAN communication, the first network device determines the aggregation communication configuration, split routing, duplication, and the like of the SL communication and the WLAN communication, and sends the related configuration to the first terminal and the second terminal.

A measurement process provided in this application is described herein by using an example.

Figure 5A:
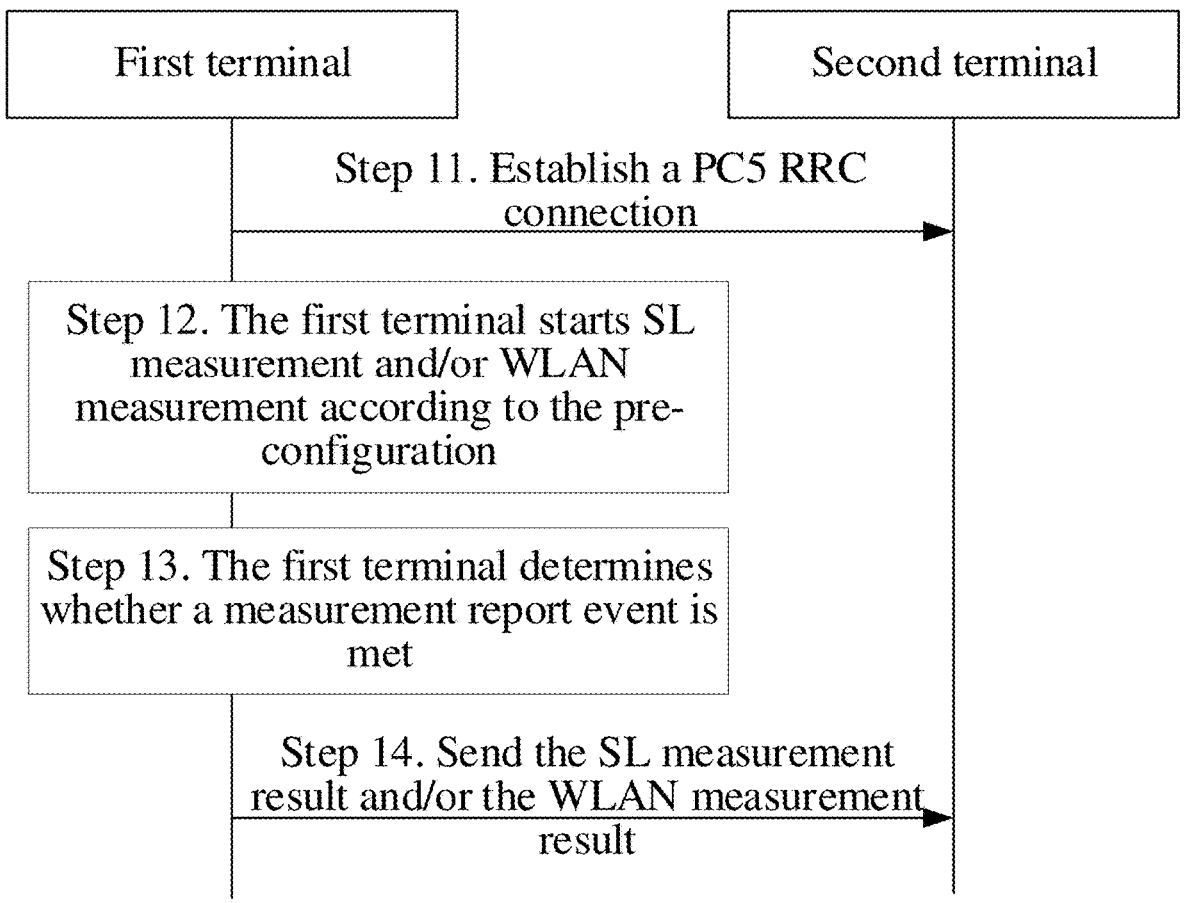
FIG. 5a to FIG. 5c are flowcharts of performing information interaction between devices according to an embodiment of this application.

FIG. 5a shows a flowchart in which a first terminal starts measurement based on a pre-configuration:
- Step 11. The first terminal establishes a PC5 RRC connection to a second terminal.
- Step 12. The first terminal starts SL measurement and/or WLAN measurement according to the pre-configuration.
- Step 13. The first terminal determines whether a measurement report event is met; and if the measurement report event is met, reports, that is, sends a measurement result. This embodiment includes two reporting manners: the first one is to periodically report an SL measurement result and/or a WLAN measurement result; and the second one is to report the SL measurement result and/or the WLAN measurement result when the first terminal meets the measurement report event.

Step 14. The first terminal reports the SL measurement result and/or the WLAN measurement result to the second terminal. The SL measurement result and/or the WLAN measurement result may be used for determining whether to configure an aggregation operation of an SL and a WLAN by the second terminal when subsequently performing service transmission with the first terminal.

Figure 5B:
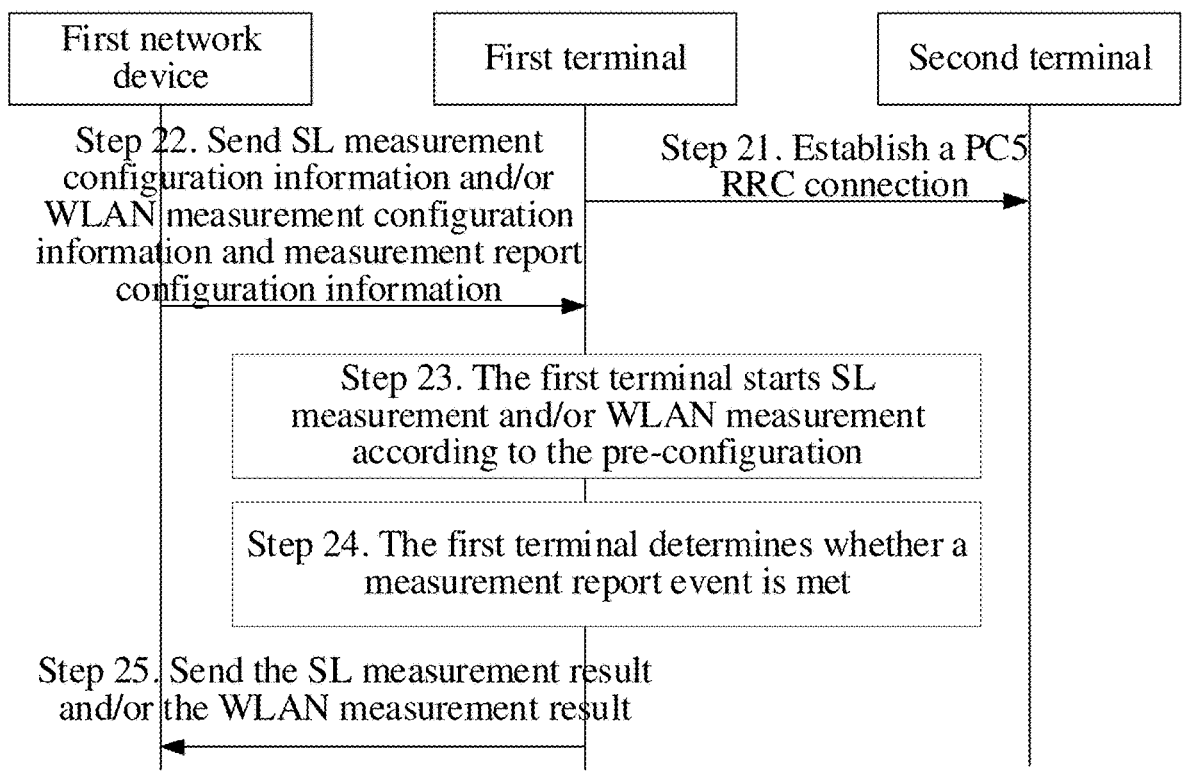

FIG. 5b shows a flowchart in which a first terminal starts measurement based on a configuration of a base station:

Step 21. The first terminal establishes a PC5 RRC connection to a second terminal.

Step 22. The first terminal receives SL measurement configuration information and/or WLAN measurement configuration information and measurement report configuration information that are configured by a network. For example, the first terminal receives the SL measurement configuration information and/or the WLAN measurement configuration information and the measurement report configuration information according to a system message or through RRC reconfiguration signaling.

Step 23. The first terminal starts SL measurement and/or WLAN measurement according to the measurement configuration information.

Step 24. The first terminal determines whether a measurement report event is met; and if the measurement report event is met, reports, that is, sends a measurement result. This embodiment includes two reporting manners: the first one is to periodically report an SL measurement result and/or a WLAN measurement result; and the second one is to report the SL measurement result and/or the WLAN measurement result when the first terminal meets the measurement report event.

Step 25. The first terminal reports the measurement result to the network, where the measurement result includes the SL measurement result and/or the WLAN measurement result. The SL measurement result and/or the WLAN measurement result may be used for determining whether to configure an aggregation operation of an SL and a WLAN by the network when subsequently performing service transmission between the second terminal and the first terminal.

Figure 5C:
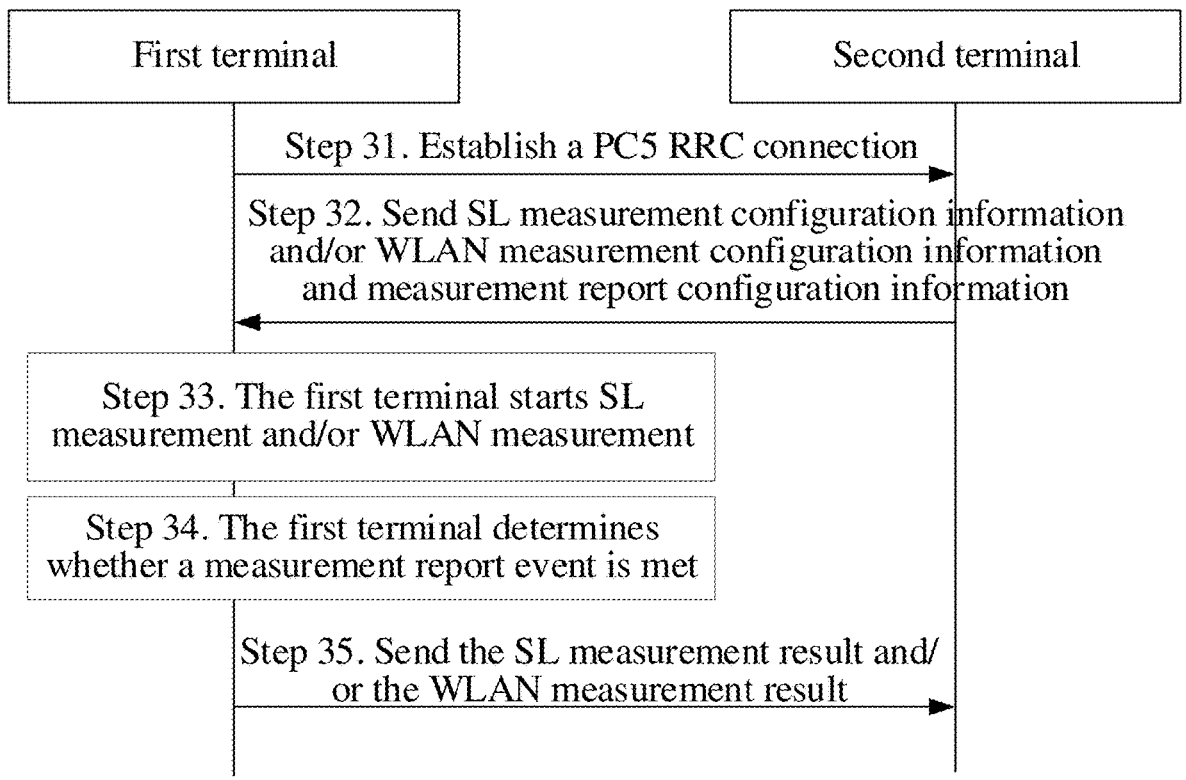

As shown in FIG. 5c, a first terminal starts measurement based on a PC5 RRC configuration of a second terminal (namely, a peer terminal):

Step 31. The first terminal establishes a PC5 RRC connection to the second terminal.

Step 32. The first terminal receives SL measurement configuration information and/or WLAN measurement configuration information and measurement report configuration information that are configured by the second terminal. For example, the second terminal sends the SL measurement configuration information and/or the WLAN measurement configuration information and the measurement report configuration information through PC5 RRC reconfiguration signaling.

Step 33. The first terminal starts SL measurement and/or WLAN measurement according to the configuration of the second terminal.

Step 34. The first terminal determines whether a measurement report event is met; and if the measurement report event is met, reports, that is, sends a measurement result. This embodiment includes two reporting manners: the first one is to periodically report an SL measurement result and/or a WLAN measurement result; and the second one is to report the SL measurement result and/or the WLAN measurement result when the first terminal meets the measurement report event.

Step 35. The first terminal sends the measurement result to the second terminal, where the measurement result includes the SL measurement result and/or the WLAN measurement result. The SL measurement result and/or the WLAN measurement result may be used for determining whether to configure an aggregation operation of an SL and a WLAN by the second terminal when subsequently performing service transmission between the second terminal and the first terminal.

In the measurement method provided in this application, by configuring measurement configuration information and measurement report configuration information for a communication, link situations of a first communication and a second communication can be learned, for example, the first communication is an SL communication, and the second communication is a WLAN communication. By configuring the measurement configuration information and the measurement report configuration information, situations of an SL link and a WLAN link can be obtained, thereby better supporting subsequently performing service transmission between devices through aggregation of the SL communication and the WLAN communication, and ensuring the service experience and system efficiency of a terminal SL.

It should be noted that, in the measurement method provided in the embodiments of this application, an execution entity may be a measurement apparatus, or a control module configured to execute the measurement method in the measurement apparatus. In this embodiment of this application, an example in which the measurement apparatus executes the measurement method is used to describe the measurement apparatus provided in the embodiments of this application.

Figure 6:
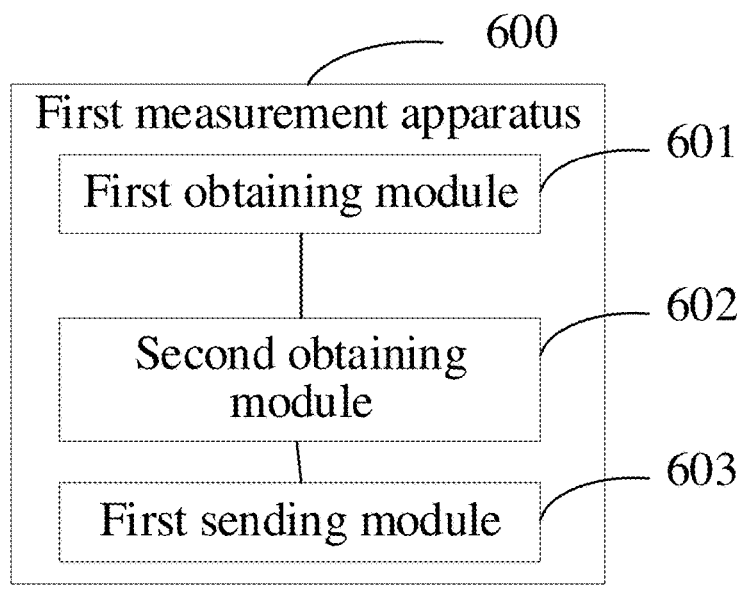
FIG. 6 is a structural diagram of a first measurement apparatus according to an embodiment of this application.

FIG. 6 is a structural diagram of a measurement apparatus according to an embodiment of this application. A first measurement apparatus 600 is applied to a first terminal, and includes:

a first obtaining module 601, configured to obtain measurement configuration information and measurement report configuration information for a communication, where the communication includes at least one of a first communication or a second communication, and the first communication or the second communication is a SL communication;

a second obtaining module 602, configured to start measurement according to the measurement configuration information, to obtain a measurement result; and a first sending module 603, configured to send the measurement result according to the measurement report configuration information.

Further, the measurement configuration information and the measurement report configuration information for the communication are determined according to a pre-configuration, or are configured by a first network device providing services for the first terminal, or are sent by a second terminal.

Further, in a case that the measurement configuration information and the measurement report configuration information for the communication are sent by the second terminal, the measurement configuration information and the measurement report configuration information for the communication are determined according to a pre-configuration of the second terminal, or are configured by a second network device, where the second network device is a network device providing services for the second terminal.

Further, there is an SL RRC connection between the second terminal and the first terminal.

Further, the first sending module 603 is configured to:
send the measurement result to the second terminal according to the measurement report configuration information;
or
send the measurement result to a second network device according to the measurement report configuration information, where the second network device is a network device providing services for the second terminal.

Further, the first sending module 603 is configured to:
send the measurement result to the first network device according to the measurement report configuration information.

Further, the measurement report configuration information is used for indicating that the first terminal sends the measurement result in at least one of the following manners:
periodically sending; or
sending in a case that a measurement report event is met.

Further, in a case that the first communication is the SL communication and the second communication is a WLAN communication, the measurement report event includes that:
an SL measurement amount is lower than a first preset threshold; and/or
the SL measurement amount is higher than a second preset threshold; and/or
an WLAN measurement amount is lower than a third preset threshold; and/or
the WLAN measurement amount is higher than a fourth preset threshold; and/or
one of the following:
in a case that both the SL measurement amount and the WLAN measurement amount are RSSIs or channel occupancy ratios, the SL measurement amount is higher than a preset threshold of the WLAN measurement amount; or
in a case that both the SL measurement amount and the WLAN measurement amount are the RSSIs or the channel occupancy ratios, the SL measurement amount is lower than the preset threshold of the WLAN measurement amount.

Further, the SL measurement amount includes:
a CBR, a CR, SL RSRP, SL RSRQ, or an SL RSSI.

Further, SL measurement configuration information includes an SL measurement object and the SL measurement amount, where
the SL measurement object includes at least one of an SL destination address or an SL frequency.

Further, in a case that the SL measurement object includes the SL frequency, the SL measurement object further includes at least one of a resource pool or a reference signal.

Further, the WLAN measurement amount includes:
a WLAN RSSI, a WLAN CR, or a WLAN RTT.

Further, WLAN measurement configuration information includes an WLAN measurement object and the WLAN measurement amount, where
the WLAN measurement object includes at least one of a WLAN version, a WLAN protocol, a WLAN frequency, a WLAN bandwidth, or a WLAN reference signal.

Further, the first communication is the SL communication, and the second communication is a WLAN communication or a Bluetooth communication.

Further, the measurement configuration information and the measurement report configuration information are carried in a system message and/or RRC reconfiguration signaling, or the measurement configuration information and the measurement report configuration information are carried in SL RRC reconfiguration signaling.

Further, in a case that the measurement result includes a WLAN measurement result, the WLAN measurement result carries WLAN identification information.

Further, the WLAN identification information includes: a basic service set identifier, a homogenous extended service set identifier, and a service set identifier.

Further, the first measurement apparatus 600 further includes a first receiving module, configured to:
receive an aggregation communication configuration of the first communication and the second communication that is determined according to the measurement result and is sent by the second terminal;
or
receive an aggregation communication configuration of the first communication and the second communication that is determined according to the measurement result and is sent by the second network device.

Further, the first measurement apparatus 600 further includes a second receiving module, configured to:
receive an aggregation communication configuration of the first communication and the second communication that is determined according to the measurement result and is sent by the first network device.

Further, the first measurement apparatus 600 further includes a second sending module, configured to:
send the aggregation communication configuration of the first communication and the second communication that is determined according to the measurement result to the second terminal.

The first measurement apparatus 600 in this embodiment of this application may be an apparatus, or may be a component, an integrated circuit, or a chip in a terminal. The apparatus may be a mobile terminal or a non-mobile terminal. Exemplarily, the mobile terminal may include, but is not limited to the types of the terminal 11 listed above, and the non-mobile terminal may be a server, a Network Attached Storage (NAS), a personal computer, a television, a teller machine, a self-service machine, or the like. This is not specifically limited in this embodiment of this application.

The first measurement apparatus 600 in this embodiment of this application may be an apparatus having an operating system. The operating system may be an Android operating system, may be an iOS operating system, and may also be another possible operating system. This is not specifically limited in this embodiment of this application.

The first measurement apparatus 600 provided in this embodiment of this application can implement all processes implemented by the method embodiments of FIG. 2. To avoid repetition, details are not described herein again.

Figure 7:
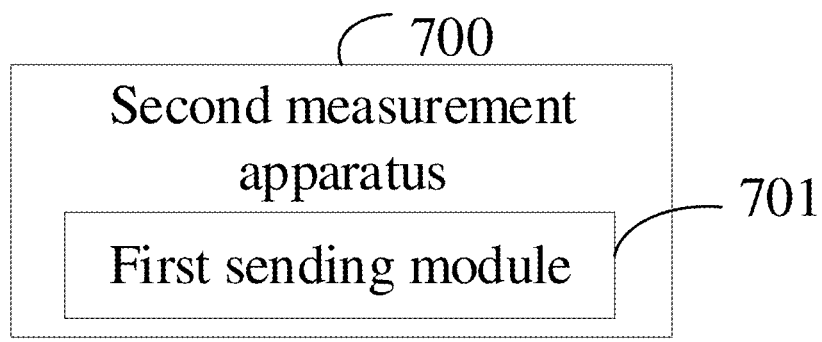
FIG. 7 is a structural diagram of a second measurement apparatus according to an embodiment of this application.

FIG. 7 is a structural diagram of a second measurement apparatus according to an embodiment of this application. A second measurement apparatus 700 is applied to a second terminal, and includes:
a first sending module 701, configured to send measurement configuration information and measurement report configuration information for a communication to a first terminal, where the communication includes at least one of a first communication or a second communication, and the first communication or the second communication is a sidelink SL communication.

Further, the measurement configuration information and the measurement report configuration information for the communication are determined according to a pre-configuration of the second terminal, or are configured by a second network device, where the second network device is a network device providing services for the second terminal.

Further, there is an SL radio resource control RRC connection between the second terminal and the first terminal.

Further, the second measurement apparatus 700 further includes:
- a first receiving module, configured to receive a measurement result sent by the first terminal.

Further, the second measurement apparatus 700 further includes:
- a second sending module, configured to send the measurement result to a second network device, where the second network device is a network device providing services for the second terminal.

Further, the measurement report configuration information is used for indicating that the first terminal sends the measurement result in at least one of the following manners:
- periodically sending; or
- sending in a case that a measurement report event is met.

Further, in a case that the first communication is the SL communication and the second communication is a WLAN communication, the measurement report event includes that:
- an SL measurement amount is lower than a first preset threshold; and/or
- the SL measurement amount is higher than a second preset threshold; and/or
- an WLAN measurement amount is lower than a third preset threshold; and/or
- the WLAN measurement amount is higher than a fourth preset threshold; and/or
- one of the following:
  - in a case that both the SL measurement amount and the WLAN measurement amount are RSSIs or channel occupancy ratios, the SL measurement amount is higher than a preset threshold of the WLAN measurement amount; or
  - in a case that both the SL measurement amount and the WLAN measurement amount are the RSSIs or the channel occupancy ratios, the SL measurement amount is lower than the preset threshold of the WLAN measurement amount.

Further, the SL measurement amount includes:
- a CBR, a CR, SL RSRP, SL RSRQ, or an SL RSSI.

Further, SL measurement configuration information includes an SL measurement object and the SL measurement amount, where
- the SL measurement object includes at least one of an SL destination address or an SL frequency.

Further, in a case that the SL measurement object includes the SL frequency, the SL measurement object further includes at least one of a resource pool or a reference signal.

Further, the WLAN measurement amount includes:
- a WLAN RSSI, a WLAN CR, or a WLAN RTT.

Further, WLAN measurement configuration information includes an WLAN measurement object and the WLAN measurement amount, where
- the WLAN measurement object includes at least one of a WLAN version, a WLAN protocol, a WLAN frequency, a WLAN bandwidth, or a WLAN reference signal.

Further, the first communication is the SL communication, and the second communication is a WLAN communication or a Bluetooth communication.

Further, the measurement configuration information and the measurement report configuration information are carried in SL RRC reconfiguration signaling.

Further, in a case that the measurement result includes a WLAN measurement result, the WLAN measurement result carries WLAN identification information.

Further, the WLAN identification information includes: a basic service set identifier, a homogenous extended service set identifier, and a service set identifier.

Further, the second measurement apparatus 700 further includes:
- a determining module, configured to determine, in a case that the measurement result includes a measurement result of the first communication and a measurement result of the second communication, an aggregation communication configuration of the first communication and the second communication according to the measurement result; and
- a third sending module, configured to send the aggregation communication configuration of the first communication and the second communication to the first terminal.

Further, the second measurement apparatus 700 further includes:
- a second receiving module, configured to receive an aggregation communication configuration of the first communication and the second communication that is determined according to the measurement result and is sent by the second network device.

The second measurement apparatus 700 in this embodiment of this application may be an apparatus, or may be a component, an integrated circuit, or a chip in a terminal. The apparatus may be a mobile terminal or a non-mobile terminal. Exemplarily, the mobile terminal may include, but is not limited to the types of the terminal 11 listed above, and the non-mobile terminal may be a server, a Network Attached Storage (NAS), a personal computer, a television, a teller machine, a self-service machine, or the like. This is not specifically limited in this embodiment of this application.

The second measurement apparatus 700 in this embodiment of this application may be an apparatus having an operating system. The operating system may be an Android operating system, may be an iOS operating system, and may also be another possible operating system. This is not specifically limited in this embodiment of this application.

The second measurement apparatus 700 provided in this embodiment of this application can implement all processes implemented by the method embodiments of FIG. 3. To avoid repetition, details are not described herein again.

Figure 8:
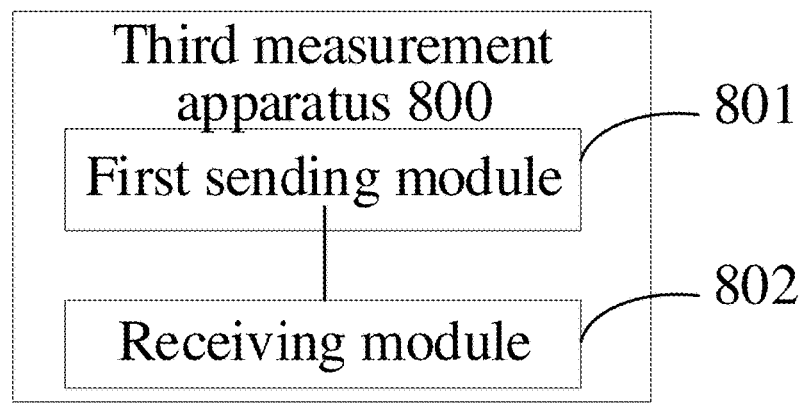
FIG. 8 is a structural diagram of a third measurement apparatus according to an embodiment of this application.

FIG. 8 is a structural diagram of a third measurement apparatus according to an embodiment of this application. A third measurement apparatus 800 is applied to a first network device, and includes:
- a first sending module 801, configured to send measurement configuration information and measurement report configuration information for a communication to a first terminal, where the communication includes at least one of a first communication or a second communication, and the first communication or the second communication is a sidelink SL communication; and
- a receiving module 802, configured to receive a measurement result sent by the first terminal.

Further, the measurement report configuration information is used for indicating that the first terminal sends the measurement result in at least one of the following manners:
- periodically sending; or
- sending in a case that a measurement report event is met.

Further, in a case that the first communication is the SL communication and the second communication is a WLAN communication, the measurement report event includes that:
    an SL measurement amount is lower than a first preset threshold; and/or
    the SL measurement amount is higher than a second preset threshold; and/or
    an WLAN measurement amount is lower than a third preset threshold; and/or
    the WLAN measurement amount is higher than a fourth preset threshold; and/or
    one of the following:
        in a case that both the SL measurement amount and the WLAN measurement amount are RSSIs or channel occupancy ratios, the SL measurement amount is higher than a preset threshold of the WLAN measurement amount; or
        in a case that both the SL measurement amount and the WLAN measurement amount are the RSSIs or the channel occupancy ratios, the SL measurement amount is lower than the preset threshold of the WLAN measurement amount.

Further, the SL measurement amount includes:
    a CBR, a CR, SL RSRP, SL RSRQ, or an SL RSSI.

Further, SL measurement configuration information includes an SL measurement object and the SL measurement amount, where
    the SL measurement object includes at least one of an SL destination address or an SL frequency.

Further, in a case that the SL measurement object includes the SL frequency, the SL measurement object further includes at least one of a resource pool or a reference signal.

Further, the WLAN measurement amount includes:
    a WLAN RSSI, a WLAN CR, or a WLAN RTT.

Further, WLAN measurement configuration information includes an WLAN measurement object and the WLAN measurement amount, where
    the WLAN measurement object includes at least one of a WLAN version, a WLAN protocol, a WLAN frequency, a WLAN bandwidth, or a WLAN reference signal.

Further, the first communication is the SL communication, and the second communication is a WLAN communication or a Bluetooth communication.

Further, the measurement configuration information and the measurement report configuration information are carried in a system message and/or RRC reconfiguration signaling.

Further, in a case that the measurement result includes a WLAN measurement result, the WLAN measurement result carries WLAN identification information.

Further, the WLAN identification information includes: a basic service set identifier, a homogenous extended service set identifier, and a service set identifier.

Further, the third measurement apparatus further includes: a determining module, configured to determine, in a case that the measurement result includes a measurement result of the first communication and a measurement result of the second communication, an aggregation communication configuration of the first communication and the second communication according to the measurement result; and
    a second sending module, configured to send the aggregation communication configuration of the first communication and the second communication to the first terminal, or send the aggregation communication configuration of the first communication and the second communication to the first terminal and a second terminal.

Further, there is an SL radio resource control RRC connection between the second terminal and the first terminal.

The third measurement apparatus 800 provided in this embodiment of this application can implement all processes implemented by the method embodiments of FIG. 4, and achieve technical effects. To avoid repetition, details are not described herein again.

Figure 9:
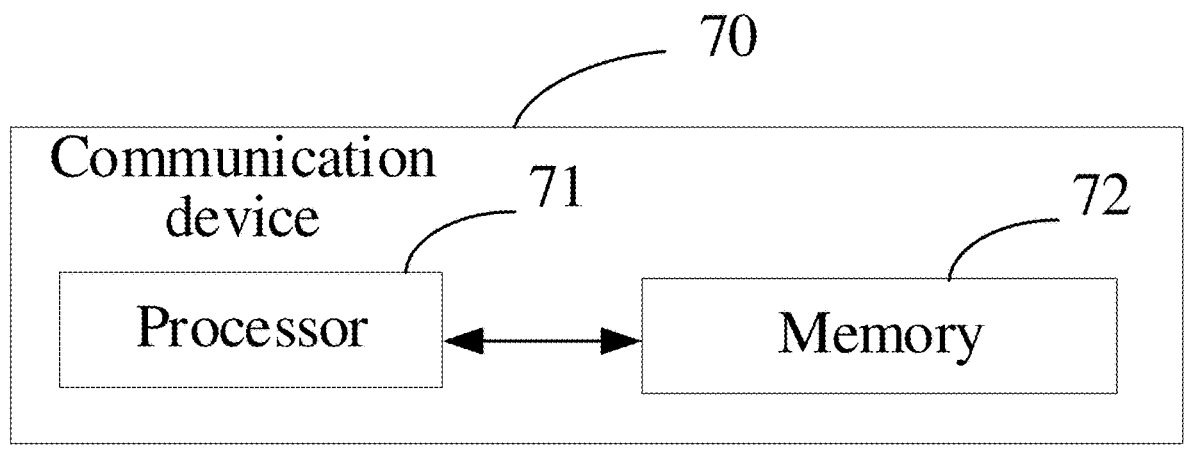
FIG. 9 is a structural diagram of a communication device according to an embodiment of this application.

In some implementations, as shown in FIG. 9, an embodiment of this application further provides a communication device 70, including a processor 71, a memory 72, and a program or instruction stored on the memory 72 and executable on the processor 71. For example, when the communication device 70 is a terminal, the program or instruction, when executed by the processor 71, implements all processes of the embodiments of the above measurement methods shown in FIG. 2 and FIG. 3. When the communication device 70 is a network-side device, the program or instruction, when executed by the processor 71, implements all processes of the embodiments of the above measurement method shown in FIG. 4. To avoid repetition, details are not described herein again.

Figure 10:
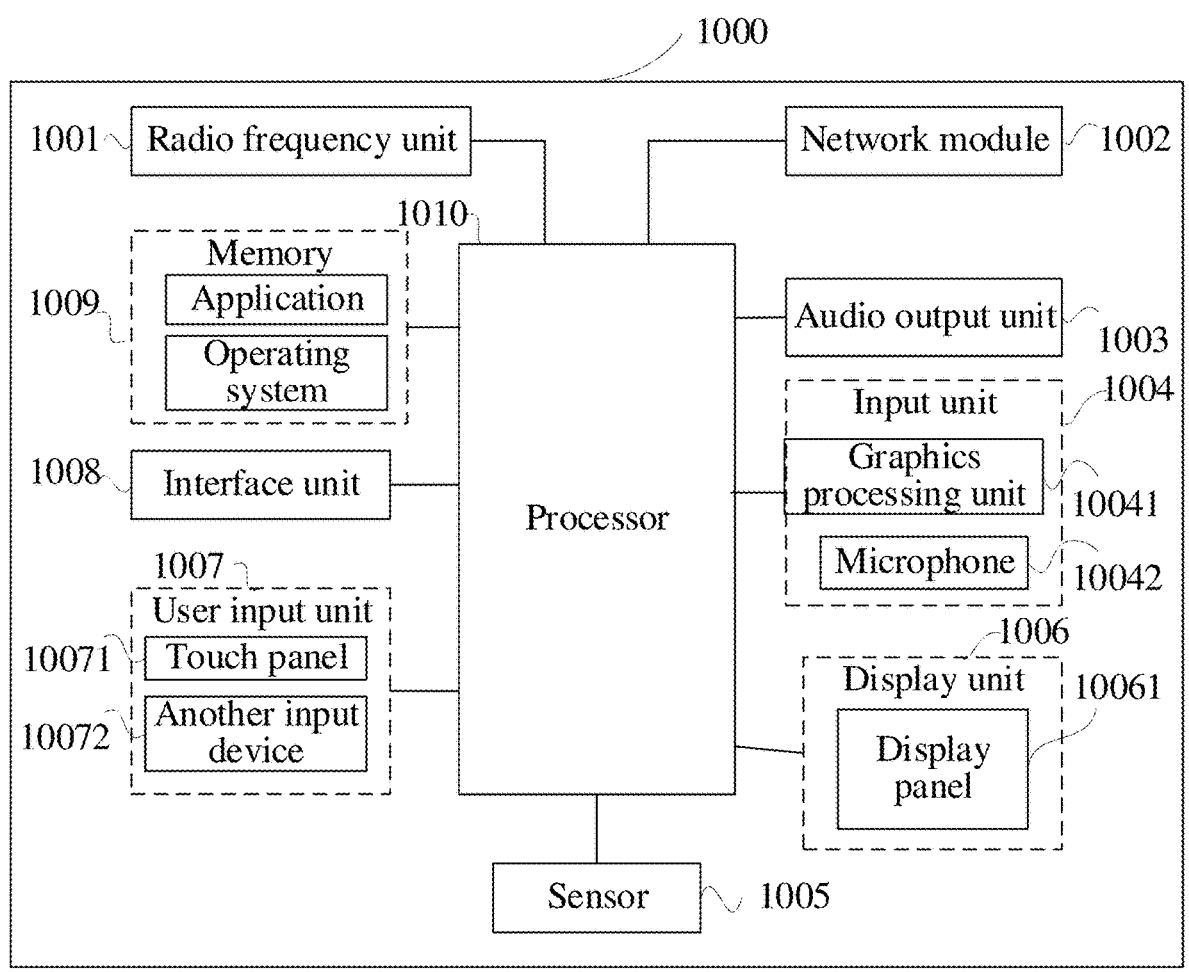
FIG. 10 is a structural diagram of a terminal according to an embodiment of this application.

FIG. 10 is a schematic diagram of a hardware structure of a terminal that implements the embodiments of this application.

A terminal 1000 includes, but is not limited to, components such as a radio frequency unit 1001, a network module 1002, an audio output unit 1003, an input unit 1004, a sensor 1005, a display unit 1006, a user input unit 1007, an interface unit 1008, a memory 1009, and a processor 1010.

A person skilled in the art may understand that the terminal 1000 further includes a power supply (such as a battery) for supplying power to the components. The power supply may logically connect to the processor 1010 by using a power supply management system, thereby implementing functions, such as charging, discharging, and power consumption management, by using the power supply management system. A terminal structure shown in FIG. 10 does not constitute a limitation to the terminal, and the terminal may include more or fewer components than those shown in the figure, or some components may be combined, or a different component deployment may be used. Details are not described herein again.

It should be understood that, in this embodiment of this application, the input unit 1004 may include a Graphics Processing Unit (GPU) 10041 and a microphone 10042. The graphics processing unit 10041 performs processing on image data of a static picture or a video that is obtained by an image acquisition apparatus (for example, a camera) in a video acquisition mode or an image acquisition mode. The display unit 1006 may include a display panel 10061, for example, the display panel 10061 may be configured in a form such as a liquid crystal display or an organic light-emitting diode. The user input unit 1007 includes a touch panel 10071 and another input device 10072. The touch panel 10071 is also referred to as a touch screen. The touch panel 10071 may include two parts: a touch detection apparatus and a touch controller. The another input device 10072 may include, but is not limited to, a physical keyboard, a functional key (for example, a volume control key or a switch key), a track ball, a mouse, and a joystick, and the details will not be described herein again.

In this embodiment of this application, the radio frequency unit 1001 receives downlink data from a network-side device and sends downlink data to the processor 1010 for processing. In addition, the radio frequency unit transmits uplink data to the base station. Generally, the radio frequency unit 1001 includes, but is not limited to, an antenna, at least one amplifier, a transceiver, a coupler, a low noise amplifier, a duplexer, and the like.

The memory 1009 may be configured to store a software program or instruction and various data. The memory 1009 may mainly include a program or instruction storage region and a data storage region. The program or instruction storage region may store an operating system, an application program or instruction required by at least one function (for example, a sound playback function and an image playback function), or the like. The memory 1009 may include a high speed random access memory, and may also include a non-volatile memory. The nonvolatile memory may be a Read-Only Memory (ROM), a Programmable ROM (PROM), an Erasable PROM (EPROM), an Electrically EPROM (EEPROM), or a flash memory. For example, the non-volatile memory may be at least one magnetic disk storage device, a flash memory device, or other volatile solid-state storage devices.

The processor 1010 may include one or more processing units. In some implementations, the processor 1010 may integrate an application processor and a modem. The application processor mainly processes an operating system, a user interface, an application program or instruction, and the like. The modem mainly processes wireless communication, such as a baseband processor. It may be understood that the foregoing modem may not be integrated into the processor 1010.

In a case that the terminal 1000 is a first terminal, the processor 1010 is configured to obtain measurement configuration information and measurement report configuration information for a communication, where the communication includes at least one of a first communication or a second communication, and the first communication or the second communication is a sidelink SL communication; and start measurement according to the measurement configuration information, to obtain a measurement result; and the radio frequency unit 1001 is configured to send the measurement result according to the measurement report configuration information.

Further, the measurement configuration information and the measurement report configuration information for the communication are determined according to a pre-configuration, or are configured by a first network device providing services for the first terminal, or are sent by a second terminal.

Further, in a case that the measurement configuration information and the measurement report configuration information for the communication are sent by the second terminal, the measurement configuration information and the measurement report configuration information for the communication are determined according to a pre-configuration of the second terminal, or are configured by a second network device, where the second network device is a network device providing services for the second terminal.

Further, there is an SL RRC connection between the second terminal and the first terminal.

Further, the radio frequency unit 1001 is further configured to send the measurement result to the second terminal according to the measurement report configuration information;

or send the measurement result to a second network device according to the measurement report configuration information, where the second network device is a network device providing services for the second terminal.

Further, the radio frequency unit 1001 is further configured to send the measurement result to the first network device according to the measurement report configuration information;

Further, the measurement report configuration information is used for indicating that the first terminal sends the measurement result in at least one of the following manners:

periodically sending; or sending in a case that a measurement report event is met.

Further, in a case that the first communication is the SL communication and the second communication is a WLAN communication, the measurement report event includes that:

an SL measurement amount is lower than a first preset threshold; and/or the SL measurement amount is higher than a second preset threshold; and/or an WLAN measurement amount is lower than a third preset threshold; and/or the WLAN measurement amount is higher than a fourth preset threshold; and/or one of the following:

in a case that both the SL measurement amount and the WLAN measurement amount are RSSIs or channel occupancy ratios, the SL measurement amount is higher than a preset threshold of the WLAN measurement amount; or in a case that both the SL measurement amount and the WLAN measurement amount are the RSSIs or the CRs, the SL measurement amount is lower than the preset threshold of the WLAN measurement amount.

Further, the SL measurement amount includes:

a CBR, a CR, SL RSRP, SL RSRQ, or a SL RSSI.

Further, for the radio frequency unit 1001, SL measurement configuration information includes an SL measurement object and the SL measurement amount, where the SL measurement object includes at least one of an SL destination address or an SL frequency.

Further, for the radio frequency unit 1001, in a case that the SL measurement object includes the SL frequency, the SL measurement object further includes at least one of a resource pool or a reference signal.

Further, for the radio frequency unit 1001, the WLAN measurement amount includes:

a WLAN RSSI, a WLAN CR, or a WLAN RTT.

Further, for the radio frequency unit 1001, WLAN measurement configuration information includes an WLAN measurement object and the WLAN measurement amount, where the WLAN measurement object includes at least one of a WLAN version, a WLAN protocol, a WLAN frequency, a WLAN bandwidth, or a WLAN reference signal.

Further, for the radio frequency unit 1001, the first communication is the SL communication, and the second communication is a WLAN communication or a Bluetooth communication.

Further, for the radio frequency unit 1001, the measurement configuration information and the measurement report configuration information are carried in a system message and/or RRC reconfiguration signaling, or the measurement configuration information and the measurement report configuration information are carried in SL RRC reconfiguration signaling.

Further, for the radio frequency unit 1001, in a case that the measurement result includes a WLAN measurement result, the WLAN measurement result carries WLAN identification information.

Further, for the radio frequency unit 1001, the WLAN identification information includes: a basic service set identifier, a homogenous extended service set identifier, and a service set identifier.

Further, the radio frequency unit 1001 is further configured to receive an aggregation communication configuration of the first communication and the second communication that is determined according to the measurement result and is sent by the second terminal;

or receive an aggregation communication configuration of the first communication and the second communication that is determined according to the measurement result and is sent by the second network device.

Further, the radio frequency unit 1001 is further configured to receive an aggregation communication configuration of the first communication and the second communication that is determined according to the measurement result and is sent by the first network device.

Further, the radio frequency unit 1001 is further configured to send the aggregation communication configuration of the first communication and the second communication that is determined according to the measurement result to the second terminal.

The terminal 1000 provided in this embodiment of this application can implement all processes implemented by the embodiments of the method of FIG. 2, and achieve technical effects. To avoid repetition, details are not described herein again.

In a case that the terminal 1000 is a second terminal, the radio frequency unit 1001 is configured to send measurement configuration information and measurement report configuration information for a communication to a first terminal, where the communication includes at least one of a first communication or a second communication, and the first communication or the second communication is a SL communication.

Further, the measurement configuration information and the measurement report configuration information for the communication are determined according to a pre-configuration of the second terminal, or are configured by a second network device, where the second network device is a network device providing services for the second terminal.

Further, there is an SL RRC connection between the second terminal and the first terminal.

Further, the radio frequency unit 1001 is further configured to:

receive a measurement result sent by the first terminal.

Further, the radio frequency unit 1001 is further configured to:

send the measurement result to a second network device, where the second network device is a network device providing services for the second terminal.

Further, the measurement report configuration information is used for indicating that the first terminal sends the measurement result in at least one of the following manners:
  periodically sending; or
  sending in a case that a measurement report event is met.

Further, in a case that the first communication is the SL communication and the second communication is a WLAN communication, the measurement report event includes that:
  an SL measurement amount is lower than a first preset threshold; and/or
  the SL measurement amount is higher than a second preset threshold; and/or
  an WLAN measurement amount is lower than a third preset threshold; and/or
  the WLAN measurement amount is higher than a fourth preset threshold; and/or
  one of the following:
    in a case that both the SL measurement amount and the WLAN measurement amount are RSSIs or channel occupancy ratios, the SL measurement amount is higher than a preset threshold of the WLAN measurement amount; or
    in a case that both the SL measurement amount and the WLAN measurement amount are the RSSIs or the CRs, the SL measurement amount is lower than the preset threshold of the WLAN measurement amount.

Further, the SL measurement amount includes:
a CBR, a CR, SL RSRP, SL RSRQ, or a SL RSSI.

Further, SL measurement configuration information includes an SL measurement object and the SL measurement amount, where
  the SL measurement object includes at least one of an SL destination address or an SL frequency.

Further, in a case that the SL measurement object includes the SL frequency, the SL measurement object further includes at least one of a resource pool or a reference signal.

Further, the WLAN measurement amount includes:
a WLAN RSSI, a WLAN CR, or a WLAN RTT.

Further, WLAN measurement configuration information includes an WLAN measurement object and the WLAN measurement amount, where
  the WLAN measurement object includes at least one of a WLAN version, a WLAN protocol, a WLAN frequency, a WLAN bandwidth, or a WLAN reference signal.

Further, the first communication is the SL communication, and the second communication is a WLAN communication or a Bluetooth communication.

Further, the measurement configuration information and the measurement report configuration information are carried in SL RRC reconfiguration signaling.

Further, in a case that the measurement result includes a WLAN measurement result, the WLAN measurement result carries WLAN identification information.

Further, the WLAN identification information includes: a basic service set identifier, a homogenous extended service set identifier, and a service set identifier.

Further, the processor 1010 is further configured to determine, in a case that the measurement result includes a measurement result of the first communication and a measurement result of the second communication, an aggregation communication configuration of the first communication and the second communication according to the measurement result; and
  the radio frequency unit 1001 is further configured to:
    send the aggregation communication configuration of the first communication and the second communication to the first terminal.

Further, the radio frequency unit 1001 is further configured to:
  receive an aggregation communication configuration of the first communication and the second communication that is determined according to the measurement result and is sent by the second network device.

The terminal 1000 provided in this embodiment of this application can implement all processes implemented by the embodiments of the method of FIG. 3. To avoid repetition, details are not described herein again.

Figure 11:
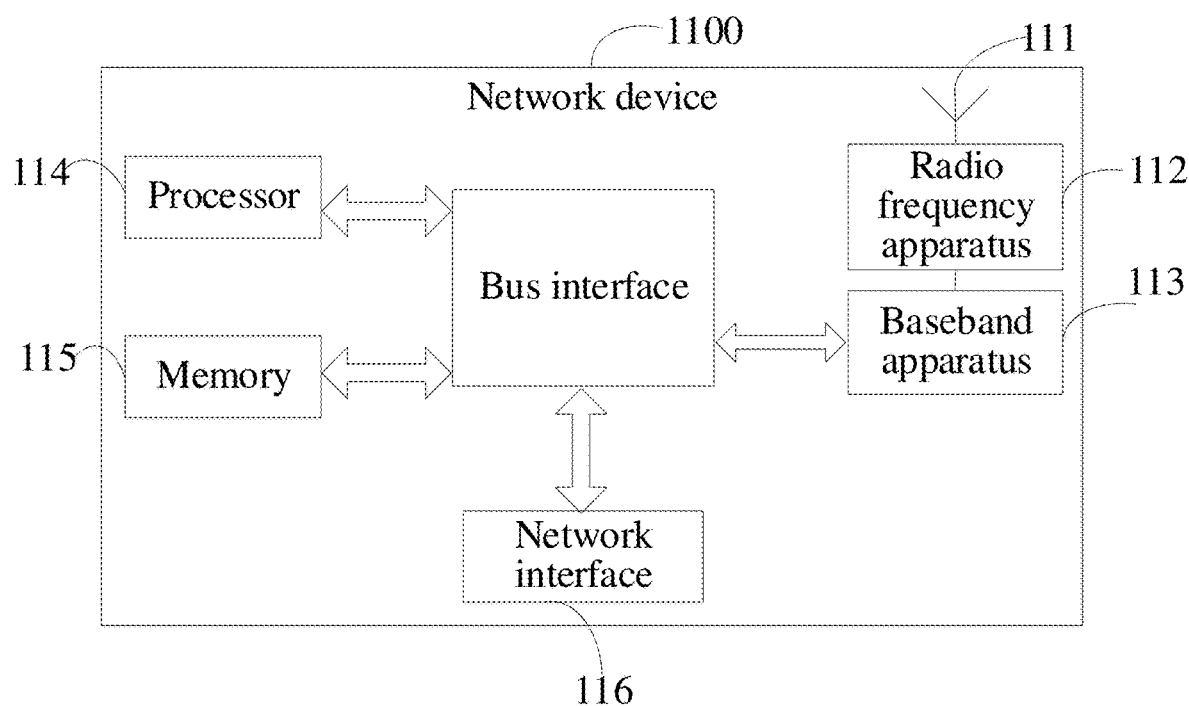
FIG. 11 is a structural diagram of a network device according to an embodiment of this application.

In some implementations, an embodiment of this application further provides a network-side device. As shown in FIG. 11, a network device 1100 includes an antenna 111, a radio frequency apparatus 112, and a baseband apparatus 113. The antenna 111 is connected to the radio frequency apparatus 112. In an uplink direction, the radio frequency apparatus 112 receives information by using the antenna 111, and sends the received information to the baseband apparatus 113 for processing. In a downlink direction, the baseband apparatus 113 processes information that is to be sent, and sends the information to the radio frequency apparatus 112. The radio frequency apparatus 112 processes the received information and sends the information by using the antenna 111.

A frequency band processing apparatus may be located in the baseband apparatus 113, so that the method executed by the network-side device in the above embodiments can be implemented in the baseband apparatus 113. The baseband apparatus 113 includes a processor 114 and a memory 115.

The baseband apparatus 113 may include, for example, at least one baseband plate. A plurality of chips are disposed on the baseband plate. As shown in FIG. 11, one of the plurality of chips is, for example, the processor 114, and is connected to the memory 115, to invoke a program in the memory 115 to perform operations of the network device in the above method embodiments.

The baseband apparatus 113 may further include a network interface 116, configured to exchange information with the radio frequency apparatus 112. The interface is, for example, a Common Public Radio Interface (CPRI).

In some implementations, the network-side device in this embodiment of the present disclosure further includes: an instruction or program stored in the memory 115 and executable on the processor 114, and the processor 114 invokes the instruction or program stored in the memory 115 to perform the method executed by various modules shown in FIG. 8. To avoid repetition, details are not described herein again.

An embodiment of this application further provides a readable storage medium, storing a program or instruction. The program or instruction, when executed by a processor, implements all processes of the embodiments of the methods shown in FIG. 2 to FIG. 4, and can achieve the same technical effects. To avoid repetition, details are not described herein again.

The processor is the processor in the terminal in the above embodiments. The readable storage medium includes a computer-readable storage medium, for example, a computer Read-Only Memory (ROM), a Random Access Memory (RAM), a magnetic disk, or an optical disc.

An embodiment of this application further provides a chip, including: a processor and a communication interface, where the communication interface is coupled to the processor, and the processor is configured to run a program or instruction of a network-side device, to implement all processes of the embodiments of the methods shown in FIG. 2 to FIG. 4. To avoid repetition, details are not described herein again.

It should be understood that, the chip mentioned in this embodiment of this application may also be referred to as a system-level chip, a system chip, a chip system, a system on chip, or the like.

An embodiment of this application further provides a computer program product, stored in a non-volatile storage medium. The computer program product is configured to be executed by at least one processor to implement all processes of the embodiments of the methods shown in FIG. 2 to FIG. 4. To avoid repetition, details are not described herein again.

It may be understood that the embodiments described in the present disclosure may be implemented by hardware, software, firmware, middleware, microcode, or a combination thereof. For hardware implementation, a module, a unit, a sub-module, and a sub-unit may be implemented in one or more Application Specific Integrated Circuits (ASIC), a Digital Signal Processing (DSP), a DSP Device (DSPD), a Programmable Logic Device (PLD), a Field-Programmable Gate Array (FPGA), a general purpose processor, a controller, a micro-controller, a microprocessor, and other electronic units configured to execute the functions described in this application, or a combination of the above.

It should be noted that, the term "include," "comprise" or any other variation thereof in this specification is intended to cover a non-exclusive inclusion, which specifies the presence of stated processes, methods, objects, or apparatuses, but does not preclude the presence or addition of one or more other processes, methods, objects, or apparatuses. Without more limitations, elements defined by the sentence "including one . . . " does not exclude that there are still other same elements in the processes, methods, objects, or apparatuses. In addition, it should be noted that the scope of the methods and apparatuses in the implementations of this application is not limited to performing the functions in the order shown or discussed, but may also include performing, according to involved functions, the functions basically simultaneously or in a reverse order. For example, the described methods may be performed in an order different from that described, and various steps may also be added, omitted, or combined. In addition, features described with reference to some examples may be combined in other examples.

Through the descriptions of the foregoing implementations, a person skilled in the art may clearly understand that the method according to the foregoing embodiments may be implemented by means of software and a necessary general hardware platform, and certainly, may alternatively be implemented by hardware. Based on such an understanding, the technical solutions in this application essentially or the part contributing to the existing technologies may be implemented in the form of a software product. The computer software product is stored in a storage medium (for example, a ROM/RAM, a magnetic disk or an optical disc), and includes several instructions for instructing a terminal (which may be a mobile phone, a computer, a server, an air conditioner, a network device, or the like) to perform the method described in the embodiments of this application.

The embodiments of this application are described above with reference to the accompanying drawings. However, this application is not limited to the foregoing specific implementations. The foregoing specific implementations are illustrative instead of limitative. Enlightened by this application, a person of ordinary skill in the art can make many forms without departing from the idea of this application and the scope of protection of the claims. All of the forms fall within the protection of this application.

What is claimed is:

1. A measurement method, performed by a first terminal, wherein the method comprises:
obtaining measurement configuration information and measurement report configuration information for a communication, wherein the communication comprises at least one of a first communication or a second communication, and the first communication or the second communication is a SideLink (SL) communication;

starting measurement according to the measurement configuration information, to obtain a measurement result; and when the measurement configuration information and the measurement report configuration information for the communication are sent by the first network device:
sending the measurement result to the first network device according to the measurement report configuration information, and
receiving, from the first network device, an aggregation communication configuration of the first communication and the second communication that is determined according to the measurement result: or when the measurement configuration information and the measurement report configuration information for the communication are sent by the second terminal:
sending the measurement result to the second terminal according to the measurement report configuration information, and
receiving an aggregation communication configuration of the first communication and the second communication that is determined according to the measurement result and is sent by the second terminal; or
sending the measurement result to a second network device according to the measurement report configuration information, wherein the second network device is a network device providing services for the second terminal, and
receiving an aggregation communication configuration of the first communication and the second communication that is determined according to the measurement result and is sent by the second network device.

2. The method according to claim 1, wherein the measurement configuration information and the measurement report configuration information for the communication are determined according to a pre-configuration, or are configured by the first network device providing services for the first terminal, or are sent by the second terminal.

3. The method according to claim 2, wherein when the measurement configuration information and the measurement report configuration information for the communication are sent by the second terminal, the measurement configuration information and the measurement report configuration information for the communication are determined according to a pre-configuration of the second terminal, or are configured by the second network device,
wherein the second network device is a network device providing services for the second terminal, and
wherein there is an SL Radio Resource Control (RRC) connection between the second terminal and the first terminal.

4. The method according to claim 1, wherein the measurement report configuration information is used for indicating that the first terminal sends the measurement result in at least one of the following:
periodically sending; or
sending when a measurement report event is met,
wherein when the first communication is the SL communication and the second communication is a Wireless Local Area Network (WLAN) communication, the measurement report event comprises that:
an SL measurement amount is lower than a first preset threshold;
the SL measurement amount is higher than a second preset threshold;
an WLAN measurement amount is lower than a third preset threshold;
the WLAN measurement amount is higher than a fourth preset threshold; or
one of the following:
when both the SL measurement amount and the WLAN measurement amount are Received Signal Strength Indications (RSSI) or Channel occupancy Ratios (CRs), the SL measurement amount is higher than a preset threshold of the WLAN measurement amount; or
when both the SL measurement amount and the WLAN measurement amount are the RSSIs or the CRs, the SL measurement amount is lower than the preset threshold of the WLAN measurement amount,
wherein the SL measurement amount comprises:
a Channel Busy Ratio (CBR), the CR, SL Reference Signal Receiving Power (RSRP), SL Reference Signal Receiving Quality (RSRQ), or an SL RSSI,
wherein SL measurement configuration information comprises an SL measurement object and the SL measurement amount, and
wherein the SL measurement object comprises at least one of an SL destination address or an SL frequency.

5. The method according to claim 4, wherein when the SL measurement object comprises the SL frequency, the SL measurement object further comprises at least one of a resource pool or a reference signal,
wherein the WLAN measurement amount comprises:
a WLAN RSSI, a WLAN CR, or a WLAN round trip time,
wherein WLAN measurement configuration information comprises an WLAN measurement object and the WLAN measurement amount, and
wherein the WLAN measurement object comprises at least one of a WLAN version, a WLAN protocol, a WLAN frequency, a WLAN bandwidth, or a WLAN reference signal.

6. The method according to claim 1, wherein the first communication is the SL communication, and the second communication is a Wireless Local Area Network (WLAN) communication or a Bluetooth communication,
wherein the measurement configuration information and the measurement report configuration information are carried in a system message or Radio Resource Control (RRC) reconfiguration signaling, or the measurement configuration information and the measurement report configuration information are carried in SL RRC reconfiguration signaling,
wherein when the measurement result comprises a WLAN measurement result, the WLAN measurement result carries WLAN identification information, and
wherein the WLAN identification information comprises: a basic service set identifier, a homogenous extended service set identifier, and a service set identifier.

7. The method according to claim 1, wherein after receiving an aggregation communication configuration of the first communication and the second communication that is determined according to the measurement result and is sent by the first network device, the method further comprises:
sending the aggregation communication configuration of the first communication and the second communication that is determined according to the measurement result to the second terminal.

8. A first terminal, comprising a processor, a memory, and a program or instruction stored on the memory and executable on the processor, the program or instruction, when executed by the processor, implementing the measurement method according to claim 1.

9. A measurement method, performed by a second terminal, wherein the method comprises:
   sending measurement configuration information and measurement report configuration information for a communication to a first terminal, wherein the communication comprises at least one of a first communication or a second communication, and wherein the first communication or the second communication is a SideLink (SL) communication; and
   receiving a measurement result sent by the first terminal;
   wherein after receiving the measurement result sent by the first terminal, the method further comprises:
   determining, when the measurement result comprises a measurement result of the first communication and a measurement result of the second communication, an aggregation communication configuration of the first communication and the second communication according to the measurement result, and
   sending the aggregation communication configuration of the first communication and the second communication to the first terminal; or
   sending the measurement result to a second network device, wherein the second network device is a network device providing services for the second terminal, and
   receiving an aggregation communication configuration of the first communication and the second communication that is determined according to the measurement result and is sent by the second network device,
   wherein the measurement report configuration information is used for indicating that the first terminal sends the measurement result in at least one of the following:
   periodically sending; or
   sending when a measurement report event is met.

10. The method according to claim 9, wherein the measurement configuration information and the measurement report configuration information for the communication are determined according to a pre-configuration of the second terminal, or are configured by the second network device, wherein the second network device is a network device providing services for the second terminal.

11. The method according to claim 9, wherein when the first communication is the SL communication and the second communication is a Wireless Local Area Network (WLAN) communication, the measurement report event comprises that:
   an SL measurement amount is lower than a first preset threshold;
   the SL measurement amount is higher than a second preset threshold;
   an WLAN measurement amount is lower than a third preset threshold;
   the WLAN measurement amount is higher than a fourth preset threshold; or
   one of the following:
   when both the SL measurement amount and the WLAN measurement amount are Received Signal Strength Indications (RSSI) or Channel occupancy Ratios (CRs), the SL measurement amount is higher than a preset threshold of the WLAN measurement amount; or
   when both the SL measurement amount and the WLAN measurement amount are the RSSIs or the CRs, the SL measurement amount is lower than the preset threshold of the WLAN measurement amount,
   wherein the SL measurement amount comprises:
   a Channel Busy Ratio (CBR), the CR, SL Reference Signal Receiving Power (RSRP), SL Reference Signal Receiving Quality (RSRQ), or an SL RSSI,
   wherein SL measurement configuration information comprises an SL measurement object and the SL measurement amount,
   wherein the SL measurement object comprises at least one of an SL destination address or an SL frequency,
   wherein when the SL measurement object comprises the SL frequency, the SL measurement object further comprises at least one of a resource pool or a reference signal,
   wherein the WLAN measurement amount comprises:
   a WLAN RSSI, a WLAN CR, or a WLAN round trip time,
   wherein WLAN measurement configuration information comprises an WLAN measurement object and the WLAN measurement amount, and
   wherein the WLAN measurement object comprises at least one of a WLAN version, a WLAN protocol, a WLAN frequency, a WLAN bandwidth, or a WLAN reference signal.

12. The method according to claim 9, wherein the first communication is the SL communication, and the second communication is a Wireless Local Area Network (WLAN) communication or a Bluetooth communication,
   wherein the measurement configuration information and the measurement report configuration information are carried in SL Radio Resource Control (RRC) reconfiguration signaling,
   wherein there is an SL RRC connection between the second terminal and the first terminal,
   wherein when the measurement result comprises a WLAN measurement result, the WLAN measurement result carries WLAN identification information, and
   wherein the WLAN identification information comprises: a basic service set identifier, a homogenous extended service set identifier, and a service set identifier.

13. A second terminal, comprising a processor, a memory, and a program or instruction stored on the memory and executable on the processor, the program or instruction, when executed by the processor, implementing the measurement method according to claim 9.

14. A measurement method, performed by a first network device, wherein the method comprises:
   sending measurement configuration information and measurement report configuration information for a communication to a first terminal, wherein the communication comprises at least one of a first communication or a second communication, and the first communication or the second communication is a SideLink (SL) communication;
   receiving a measurement result sent by the first terminal;
   determining, when the measurement result comprises a measurement result of the first communication and a measurement result of the second communication, an aggregation communication configuration of the first communication and the second communication according to the measurement result; and
   sending the aggregation communication configuration of the first communication and the second communication to the first terminal, or sending the aggregation communication configuration of the first communication and the second communication to the first terminal and a second terminal, wherein there is an SL RRC connection between the second terminal and the first terminal.

15. The method according to claim 14, wherein the measurement report configuration information is used for indicating that the first terminal sends the measurement result in at least one of the following:
periodically sending; or
sending when a measurement report event is met,
wherein when the first communication is the SL communication and the second communication is a Wireless Local Area Network (WLAN) communication, the measurement report event comprises that:
an SL measurement amount is lower than a first preset threshold;
the SL measurement amount is higher than a second preset threshold;
an WLAN measurement amount is lower than a third preset threshold;
the WLAN measurement amount is higher than a fourth preset threshold; or
one of the following:
when both the SL measurement amount and the WLAN measurement amount are Received Signal Strength Indications (RSSI) or Channel occupancy Ratios (CRs), the SL measurement amount is higher than a preset threshold of the WLAN measurement amount; or
when both the SL measurement amount and the WLAN measurement amount are the RSSIs or the CRs, the SL measurement amount is lower than the preset threshold of the WLAN measurement amount,
wherein the SL measurement amount comprises:
a Channel Busy Ratio (CBR), the CR, SL Reference Signal Receiving Power (RSRP), SL Reference Signal Receiving Quality (RSRQ), or an SL Received Signal Strength Indication (RSSI),
wherein SL measurement configuration information comprises an SL measurement object and the SL measurement amount,
wherein the SL measurement object comprises at least one of an SL destination address or an SL frequency, and
wherein when the SL measurement object comprises the SL frequency, the SL measurement object further comprises at least one of a resource pool or a reference signal.

* * * * *